(12) United States Patent
Khosla et al.

(10) Patent No.: US 10,051,650 B2
(45) Date of Patent: Aug. 14, 2018

(54) IDENTIFYING RADIO ACCESS TECHNOLOGY (RAT) COEXISTENCE CONFLICTS USING A PRIORITY-BASED MECHANISM

(71) Applicant: QUALCOMM Incorporated, San Diego, CA (US)

(72) Inventors: Chetan Khosla, Longmont, CO (US); Brian Theodore Lubars, Boulder, CO (US); Christopher A. Barrett, Longmont, CO (US); Temitope Akinsipe, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/153,485

(22) Filed: May 12, 2016

(65) Prior Publication Data

US 2016/0338071 A1 Nov. 17, 2016

Related U.S. Application Data

(60) Provisional application No. 62/162,606, filed on May 15, 2015.

(51) Int. Cl.
*H04W 4/00* (2018.01)
*H04W 72/12* (2009.01)
*H04W 88/06* (2009.01)

(52) U.S. Cl.
CPC ........ *H04W 72/1215* (2013.01); *H04W 88/06* (2013.01)

(58) Field of Classification Search
CPC .......................... H04W 72/1215; H04W 88/06
See application file for complete search history.

(56) References Cited

U.S. PATENT DOCUMENTS 9,706,442 B2* 7/2017 Hageltorn ......... H04W 36/0016
2012/0069766 A1* 3/2012 Fu .......................... H04B 1/406
370/252

(Continued)

OTHER PUBLICATIONS

ISA/EP, International Search Report and Written Opinion of the International Searching Authority, Int'l. App. No. PCT/US2016/032536, Aug. 9, 2016, European Patent Office, Rijswijk, NL, 13 pgs.

(Continued)

*Primary Examiner* — Clemence S Han
(74) *Attorney, Agent, or Firm* — Holland & Hart LLP

(57) ABSTRACT

Methods, systems, and devices are described for wireless communication. A method may include maintaining a plurality of conflict entries, each conflict entry indicating a first frequency range associated with interference by a first radio access technology (RAT) and a second frequency range associated with interference by a second RAT. Each conflict entry may indicate a first frequency range of component carriers of a RAT operating in carrier aggregation mode. Active coexistence conflicts may be identified between the first and second RATs based in part on the conflict entries and current radio conditions. The method may also include selecting one of the active coexistence conflicts for conflict mitigation. In some examples, a subset of the conflict entries are organized into an intermodulation group. The method may also include determining a conflict priority for each conflict entry associated with an active coexistence conflict. In some examples, conflict priorities may be aggregated.

30 Claims, 14 Drawing Sheets

(56) References Cited

U.S. PATENT DOCUMENTS

| | | | | |
|---|---|---|---|---|
| 2012/0327869 A1* | 12/2012 | Wang | ............... | H04W 72/1215 |
| | | | | 370/329 |
| 2013/0250871 A1* | 9/2013 | Kaukovuori | ........ | H04W 72/082 |
| | | | | 370/329 |
| 2013/0310045 A1* | 11/2013 | Yan | ..................... | H04B 7/0608 |
| | | | | 455/437 |
| 2015/0103758 A1* | 4/2015 | Wang | ............... | H04W 72/0426 |
| | | | | 370/329 |
| 2015/0264602 A1* | 9/2015 | Hageltorn | ......... | H04W 36/0016 |
| | | | | 455/436 |
| 2015/0334575 A1* | 11/2015 | Joshi | ................ | H04W 72/0453 |
| | | | | 370/329 |
| 2017/0048773 A1* | 2/2017 | Miao | ................... | H04W 8/183 |
| 2017/0094628 A1* | 3/2017 | Miao | ................. | H04W 60/005 |
| 2017/0127217 A1* | 5/2017 | Miao | ..................... | H04W 4/003 |

OTHER PUBLICATIONS

Qualcomm Incorporated, "Necessary Solutions Methods for InDevice Coexistence," 3GPP TSG-RAN WG2 Meeting #74, R2-113352, Barcelone, Spain, May 9-13, 2011, 3 pgs., 3rd Generation Partnership Project.

\* cited by examiner

IDENTIFYING RADIO ACCESS TECHNOLOGY (RAT) COEXISTENCE CONFLICTS USING A PRIORITY-BASED MECHANISM

CROSS REFERENCES

The present Application for Patent claims priority to U.S. Provisional Patent Application No. 62/162,606 by Khosla et al., entitled "Identifying Radio Access Technology (RAT) Coexistence Conflicts Using A Priority-Based Mechanism," filed May 15, 2015, assigned to the assignee hereof.

BACKGROUND

The following relates generally to wireless communications, and more specifically to techniques for identifying and managing conflicts between coexisting radio access technologies (RATs) in a wireless device.

Wireless communication systems are widely deployed to provide various types of communication content such as voice, video, packet data, messaging, broadcast, and so on. These systems may be multiple-access systems capable of supporting communication with multiple users by sharing available system resources (e.g., time, frequency, and power).

In many cases, a wireless device may have multiple radios corresponding to different RATs which may be transmitting or receiving at the same time. For example, a wireless communication device may use one radio to send and receive wireless local area network (WLAN) communications and another radio to send and receive cellular communications. The proximity of the radios to each other may result in unwanted interference, especially when both of the radios are operating at the same time. Interference between coexisting RATs may be particularly disruptive when the RATs operate on the same frequency or overlapping frequencies, have overlapping harmonics, or result in intermodulation within an active band.

SUMMARY

A wireless device configured to operate using multiple coexisting radio access technologies (RATs) may employ priority-based techniques to manage conflicts between the coexisting RATs. For example, the device may maintain a record, such as a table, which has a set of conflict entries. Each conflict entry may indicate a first frequency range associated with interference by a first RAT and a second frequency range associated with interference by a second RAT. When the first RAT is operating within the first frequency range while the second RAT is concurrently operating within the second frequency range, that particular conflict entry may be considered active. Each conflict entry may also include or reference an associated mitigation process for lessening or eliminating the interference caused by the conflict.

In some situations, multiple conflict entries can be active at the same time. When this occurs (i.e., multiple conflict entries are active), the mitigation processes associated with the active conflict entries may be non-orthogonal. In other words, it may not be possible to perform both mitigation processes concurrently to reduce the interference associated with both active conflict entries. The present disclosure provides grouping, prioritization, and carrier aggregation management techniques for improving the effectiveness of selecting one or more of the active conflict entries for remediation.

A method of wireless communication is described. The method may include maintaining a plurality of conflict entries, each conflict entry indicating a first frequency range associated with interference by a first RAT and a second frequency range associated with interference by a second RAT, wherein a subset of the conflict entries are organized into an intermodulation group, identifying one or more active coexistence conflicts between the first RAT and the second RAT based at least in part on the conflict entries and current radio conditions, and selecting at least one of the one or more active coexistence conflicts for conflict mitigation, the selected active coexistence conflict being a member of the intermodulation group.

An apparatus for wireless communication is described. The apparatus may include means for maintaining a plurality of conflict entries, each conflict entry indicating a first frequency range associated with interference by a first RAT and a second frequency range associated with interference by a second RAT, wherein a subset of the conflict entries are organized into an intermodulation group, means for identifying one or more active coexistence conflicts between the first RAT and the second RAT based at least in part on the conflict entries and current radio conditions, and means for selecting at least one of the one or more active coexistence conflicts for conflict mitigation, the selected active coexistence conflict being a member of the intermodulation group.

A further apparatus for wireless communication is described. The apparatus may include a memory that stores instructions and a processor coupled with the memory. The processor and the memory are configured to maintain a plurality of conflict entries, each conflict entry indicating a first frequency range associated with interference by a first RAT and a second frequency range associated with interference by a second RAT, wherein a subset of the conflict entries are organized into an intermodulation group, identify one or more active coexistence conflicts between the first RAT and the second RAT based at least in part on the conflict entries and current radio conditions, and select at least one of the one or more active coexistence conflicts for conflict mitigation, the selected active coexistence conflict being a member of the intermodulation group.

A non-transitory computer-readable medium storing code for wireless communication is described. The code may include instructions executable to maintain a plurality of conflict entries, each conflict entry indicating a first frequency range associated with interference by a first RAT and a second frequency range associated with interference by a second RAT, wherein a subset of the conflict entries are organized into an intermodulation group, identify one or more active coexistence conflicts between the first RAT and the second RAT based at least in part on the conflict entries and current radio conditions, and select at least one of the one or more active coexistence conflicts for conflict mitigation, the selected active coexistence conflict being a member of the intermodulation group.

In some examples of the method, apparatuses, or non-transitory computer-readable medium described herein, the selection of the at least one of the one or more active coexistence conflicts is based at least in part on a determination that all conflict entries in the intermodulation group are in the one or more identified active coexistence conflicts. Additionally or alternatively, in some examples the selection of the at least one of the active coexistence conflicts for conflict mitigation is based at least in part on an active coexistence conflict associated with a largest amount of coexistence interference.

Some examples of the method, apparatuses, or non-transitory computer-readable medium described herein may further include processes, features, means, or instructions for performing a mitigation policy associated with the at least one selected active coexistence conflict. Additionally or alternatively, some examples may include processes, features, means, or instructions for determining that the current radio conditions indicate that the first RAT is active and that the second RAT is active.

In some examples of the method, apparatuses, or non-transitory computer-readable medium described herein, the plurality of conflict entries further indicate a third frequency range associated with interference by a third RAT, and wherein identifying the one or more active coexistence conflicts further includes identifying the one or more active coexistence conflicts between the third RAT and one or both of the first RAT and the second RAT. Additionally or alternatively, in some examples at least one of the conflict entries indicates a frequency range associated with interference by one of a plurality of component carriers of the first RAT operating in a carrier aggregation mode.

Some examples of the method, apparatuses, or non-transitory computer-readable medium described herein may further include processes, features, means, or instructions for determining a conflict priority for each active coexistence conflict, wherein selecting one of the active coexistence conflicts is based at least in part on the conflict priorities. Additionally or alternatively, in some examples the conflict priority for each active coexistence conflict comprises an aggregate conflict priority based at least in part on a first conflict priority associated with the first RAT and a second conflict priority associated with the second RAT.

In some examples of the method, apparatuses, or non-transitory computer-readable medium described herein, the conflict priority is based at least in part on one or more of a type of conflict, a frequency offset, a direction of traffic, and a type of RAT.

In examples of the method, apparatuses, or non-transitory computer-readable medium described herein, each conflict entry indicating the first frequency range associated with interference by the first RAT is by one of a plurality of component carriers of the first RAT operating in a carrier aggregation mode. The one or more active coexistence conflicts may be further identified between the component carrier of the first RAT and the second RAT. In some examples, at least one conflict entry applies to a component carrier of the second RAT, or a component carrier of the first RAT, or a combination thereof.

Some examples of the method, apparatuses, or non-transitory computer-readable medium described herein include determining an aggregate RAT conflict priority for each conflict entry associated with an active coexistence conflict based at least in part on a first RAT conflict priority and a second RAT conflict priority of that conflict entry, wherein the selection of the at least one active coexistence conflict is based at least in part on the aggregate RAT conflict priority. In some examples, selecting the at least one active coexistence conflict is based at least in part on a determination that all conflict entries in the intermodulation group are in the one or more active coexistence conflicts.

A method of wireless communication is described. The method may include maintaining a plurality of conflict entries, each conflict entry indicating a first frequency range associated with interference by one of a plurality of component carriers of a first RAT operating in a carrier aggregation mode and a second frequency range associated with interference by a second RAT, identifying one or more active coexistence conflict between the component carrier of the first RAT and the second RAT based at least in part on the conflict entries and current radio conditions, and selecting at least one of the one or more active coexistence conflicts for conflict mitigation.

An apparatus for wireless communication is described. The apparatus may include means for maintaining a plurality of conflict entries, each conflict entry indicating a first frequency range associated with interference by one of a plurality of component carriers of a first RAT operating in a carrier aggregation mode and a second frequency range associated with interference by a second RAT, means for identifying one or more active coexistence conflict between the component carrier of the first RAT and the second RAT based at least in part on the conflict entries and current radio conditions, and means for selecting at least one of the one or more active coexistence conflicts for conflict mitigation.

A further apparatus for wireless communication is described. The apparatus may include a memory that stores instructions and a processor coupled with the memory. The processor and the memory are configured to maintain a plurality of conflict entries, each conflict entry indicating a first frequency range associated with interference by one of a plurality of component carriers of a first RAT operating in a carrier aggregation mode and a second frequency range associated with interference by a second RAT, identify one or more active coexistence conflict between the component carrier of the first RAT and the second RAT based at least in part on the conflict entries and current radio conditions, and select at least one of the one or more active coexistence conflicts for conflict mitigation.

A non-transitory computer-readable medium storing code for wireless communication is described. The code may include instructions executable to maintain a plurality of conflict entries, each conflict entry indicating a first frequency range associated with interference by one of a plurality of component carriers of a first RAT operating in a carrier aggregation mode and a second frequency range associated with interference by a second RAT, identify one or more active coexistence conflict between the component carrier of the first RAT and the second RAT based at least in part on the conflict entries and current radio conditions, and select at least one of the one or more active coexistence conflicts for conflict mitigation.

In some examples of the method, apparatuses, or non-transitory computer-readable medium described herein, at least one conflict entry applies to a component carrier of the second RAT. Additionally or alternatively, in some examples at least one conflict entry applies to a component carrier of the first RAT.

Some examples of the method, apparatuses, or non-transitory computer-readable medium described herein may further include processes, features, means, or instructions for determining an aggregate RAT conflict priority for each conflict entry associated with an active coexistence conflict based at least in part on a first RAT conflict priority and a second RAT conflict priority of that conflict entry, and the selection of the at least one of the one or more active coexistence conflicts is based at least in part on the aggregate RAT conflict priority. Additionally or alternatively, in some examples a subset of the conflict entries are organized into an intermodulation group, and wherein the selected at least one of the one or more active coexistence conflicts is a member of the intermodulation group.

In some examples of the method, apparatuses, or non-transitory computer-readable medium described herein, the selection of the at least one of the one or more active coexistence conflicts is based at least in part on a determination that all of the conflict entries in the intermodulation group are in the plurality of identified active coexistence conflicts.

A method of wireless communication is described. The method may include maintaining a plurality of conflict entries, each conflict entry indicating a first frequency range associated with interference by a first RAT and a second frequency range associated with interference by a second RAT, identifying one or more active coexistence conflicts between the first RAT and the second RAT based at least in part on the conflict entries and current radio conditions, determining, for each conflict entry associated with an active coexistence conflict of the plurality of active coexistence conflicts, a first RAT conflict priority and a second RAT conflict priority, and selecting at least one of the one or more active coexistence conflicts for conflict mitigation based at least in part on the first RAT conflict priority and the second RAT conflict priority of the selected active coexistence conflict.

An apparatus for wireless communication is described. The apparatus may include means for maintaining a plurality of conflict entries, each conflict entry indicating a first frequency range associated with interference by a first RAT and a second frequency range associated with interference by a second RAT, means for identifying one or more active coexistence conflicts between the first RAT and the second RAT based at least in part on the conflict entries and current radio conditions, means for determining, for each conflict entry associated with an active coexistence conflict of the plurality of active coexistence conflicts, a first RAT conflict priority and a second RAT conflict priority, and means for selecting at least one of the one or more active coexistence conflicts for conflict mitigation based at least in part on the first RAT conflict priority and the second RAT conflict priority of the selected active coexistence conflict.

A further apparatus for wireless communication is described. The apparatus may include a memory that stores instructions and a processor coupled with the memory. The processor and the memory are configured to maintain a plurality of conflict entries, each conflict entry indicating a first frequency range associated with interference by a first RAT and a second frequency range associated with interference by a second RAT, identify one or more active coexistence conflicts between the first RAT and the second RAT based at least in part on the conflict entries and current radio conditions, determine, for each conflict entry associated with an active coexistence conflict of the plurality of active coexistence conflicts, a first RAT conflict priority and a second RAT conflict priority, and select at least one of the one or more active coexistence conflicts for conflict mitigation based at least in part on the first RAT conflict priority and the second RAT conflict priority of the selected active coexistence conflict.

A non-transitory computer-readable medium storing code for wireless communication is described. The code may include instructions executable to maintain a plurality of conflict entries, each conflict entry indicating a first frequency range associated with interference by a first RAT and a second frequency range associated with interference by a second RAT, identify one or more active coexistence conflicts between the first RAT and the second RAT based at least in part on the conflict entries and current radio conditions, determine, for each conflict entry associated with an active coexistence conflict of the plurality of active coexistence conflicts, a first RAT conflict priority and a second RAT conflict priority, and select at least one of the one or more active coexistence conflicts for conflict mitigation based at least in part on the first RAT conflict priority and the second RAT conflict priority of the selected active coexistence conflict.

In some examples of the method, apparatuses, or non-transitory computer-readable medium described herein, the selection of the at least one of the one or more active coexistence conflicts is based at least in part on a determination that the at least one of the one or more active coexistence conflicts has a highest conflict priority. Additionally or alternatively, some examples may include processes, features, means, or instructions for determining an aggregate RAT conflict priority for each conflict entry associated with an active coexistence conflict based at least in part on the first RAT conflict priority and the second RAT conflict priority of that conflict entry, and the selection of the at least one of the one or more active coexistence conflicts is based at least in part on the aggregate RAT conflict priority.

In some examples of the method, apparatuses, or non-transitory computer-readable medium described herein, the aggregate RAT conflict priority is based at least in part on one or more of: an addition of the first RAT conflict priority and the second RAT conflict priority, a concatenation of the first RAT conflict priority and the second RAT conflict priority, or a weighted combination of the first RAT conflict priority and the second RAT conflict priority.

BRIEF DESCRIPTION OF THE DRAWINGS

Aspects of the disclosure are described in reference to the following figures.

DETAILED DESCRIPTION

Figure 1:
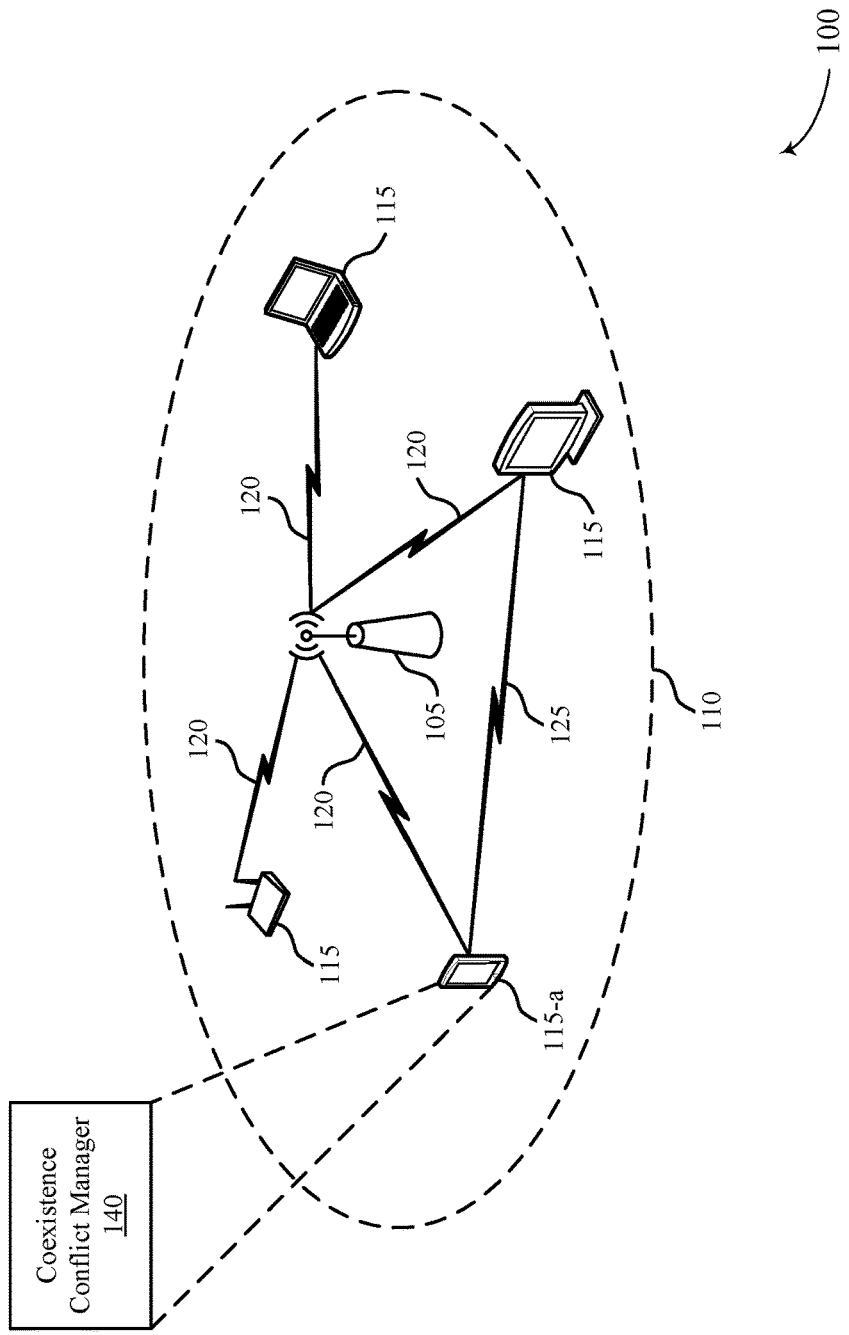
FIG. 1 illustrates a wireless communication system for identifying radio access technology (RAT) coexistence conflicts, configured in accordance with various aspects of the present disclosure.

A wireless device configured to operate using multiple coexisting radio access technologies (RATs) may employ priority-based techniques to manage conflicts between the coexisting RATs. Specifically, the device may maintain a table or other record having a set of conflict entries, with each conflict entry indicating a first frequency range associated with interference by a first RAT and a second frequency range associated with interference by a second RAT. A conflict entry may be considered active when the first RAT is operating within the first frequency range while the second RAT is concurrently operating within the second frequency range. Each conflict entry may also include or reference an associated mitigation process for lessening or eliminating the interference caused by the conflict associated with the conflict entry.

When multiple conflict entries are active, the mitigation processes associated with the active conflict entries may be non-orthogonal. In other words, it may not be possible to perform both mitigation processes concurrently to reduce the interference associated with both active conflict entries. The present disclosure provides grouping, prioritization, and carrier aggregation management techniques for improving the effectiveness of selecting one or more of the active conflict entries for remediation.

The grouping techniques involve identifying one or more sets of interdependent conflict entries that are indicative of coexistence interference only when each of the conflict entries is active. In one example, each identified set of interdependent conflict entries can then be assigned to a common group, such that a conflict entry belonging to the group can only be active if the conditions specified by all of the conflict entries in that group are met. This use of grouping may reduce the number of false positives when selecting conflict entries for mitigation.

The prioritization techniques may involve determining, for each active conflict entry, a separate priority for each RAT specified in that conflict entry. The priority of each RAT in each conflict priority may be based on different factors associated with current operations of the wireless device within the frequency range specified for that RAT in the conflict entry. These factors may include the current direction of traffic of the specified RAT within the specified frequency range, whether a center frequency currently used by the specified RAT matches a center of the specified frequency range for that RAT in the conflict entry, and an amount of overlap between the frequency range currently used by the RAT and the specified frequency range for that RAT in the conflict entry. An aggregate priority of each active conflict entry may be determined based on a combination, aggregation, or concatenation of the determined priority of each RAT for that conflict entry, and the wireless device can then select one or more of the active conflict entries for conflict mitigation on the basis of the aggregate priority.

The carrier aggregation management techniques may involve evaluating each component carrier of a RAT separately for the purpose of identifying coexistence RATs. Thus, when the wireless device operates using multiple component carriers of the same RAT, the frequency range employed by each component carrier of the RAT may be taken into consideration when determining whether a conflict entry is currently active. By accounting for all component carriers of a RAT when evaluating each conflict entry, the wireless device may obtain a more accurate representation of what coexistence conflicts are currently active and candidates for mitigation.

Aspects of the disclosure are initially described in the context of a wireless communication system. Specific examples are then described for identifying active coexistence conflicts and selecting one of the active coexistence conflicts for mitigation. These and other aspects of the disclosure are further illustrated by and described with reference to apparatus diagrams, system diagrams, and flowcharts that relate to identifying RAT coexistence conflicts.

FIG. 1 illustrates a wireless communication system 100 (e.g., a wireless local area network (WLAN), also known as a wireless fidelity (Wi-Fi) network) for identifying radio access technology (RAT) coexistence conflicts, configured in accordance with various aspects of the present disclosure. The wireless communication system 100 may include an access point (AP) 105 and multiple associated stations (STAs) 115, which may represent devices such as wireless communications devices, access terminals, user equipment, mobile stations, mobile phones, smartphones, personal digital assistant (PDAs), other handheld devices, netbooks, notebook computers, tablet computers, laptops, display devices (e.g., TVs, computer monitors, etc.), printers, and the like. The STAs 115 may communicate with the AP 105 using wireless links 125. The various STAs 115 in the wireless communication system 100 are able to communicate with one another through the AP 105.

A STA 115 may be located in the intersection of more than one coverage area 110 and may associate with more than one AP 105. The AP 105 and the associated STAs 115 may represent a base service set (BSS) or an extended service set (ESS). For example, a single AP 105 and an associated set of STAs 115 may be referred to as a BSS. An ESS is a set of connected BSSs. An extended network station may be associated with the wireless communication system 100 and may be connected to a wired or wireless distribution system (DS) that may allow multiple APs 105 to be connected in an ESS.

Also shown is a coverage area 110 of the AP 105, which may represent a basic service area (BSA) of the wireless communication system 100. In some cases, the coverage area 110 of an AP 105 may be divided into sectors. Wireless communication system 100 may include APs 105 of different types (e.g., metropolitan area network, home network, enterprise network, etc.), with varying and overlapping coverage areas 110. Other wireless devices besides the STA 115 can communicate with the AP 105. Further, a STA 115 can be covered by more than one AP 105 and can therefore associate with at least one AP 105 at different times. Some of the STAs 115 may also communicate with other network devices in addition to the AP 105. For example, a STA 115 may communicate with another type of network device (e.g., a base station) using a different radio access technology (e.g., Long-Term Evolution (LTE) (e.g., technology using licensed spectrum LTE protocols or versions of LTE protocols customized for use wholly or partially in the unlicensed spectrum) or another cellular communication technology).

Two STAs 115 may also communicate directly via a direct wireless link 125 regardless of whether both STAs 115 are in the same coverage area 110. Examples of direct wireless links 125 may include peer-to-peer communications, Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, IEEE 802.11b, 802.11g, 802.11a, 802.11n, 802.11ac, 802.11ad, 802.11ah, 802.11ax, etc. In other implementations, peer-to-peer connections or ad hoc networks may be implemented within a WLAN, for example wireless communication system 100.

A STA 115-a may have two or more co-located RATs and communicate using two or more of these RATs at roughly the same time. Communications on one RAT may cause interference with the other RAT. Another source of interference may be from a carrier component of one RAT interfering with another carrier component of the RAT. As an example using FIG. 1, STA 115-a communicates with the AP 105 using a WLAN protocol, such as an IEEE 802.11 protocol. Transmissions on the WLAN may have to be adjusted to avoid interference on a second RAT if the STA 115-a is also communicating with another network device using a second RAT on a same or adjacent frequency band. For example, the STA 115-a may communicate with a base station (BS) (e.g., BS 205 as shown in FIG. 2) over an LTE network while communicating with the AP 105 over a WLAN.

The STA 115-a may include a coexistence conflict manager 140 that can identify interference between two or more RATs or between carrier components of one or more RATs. As described in more detail below, the coexistence conflict manager 140 may be implemented by special-purpose hardware (e.g., an application-specific integrated circuit (ASIC) or specialized chipset), a processor programmed with instructions to perform a set of coexistence conflict management features, or a combination thereof. The coexistence conflict manager 140 may maintain conflict entries for each potential conflict between RATs and their carrier components on the STA 115-a. The coexistence conflict manager 140 may also check for active coexistence conflicts when current radio conditions warrant. If the coexistence conflict manager 140 detects one or more active coexistence conflicts, the coexistence conflict manager 140 may select one for conflict mitigation. The coexistence conflict manager 140 may serve other functions as well.

Figure 2:
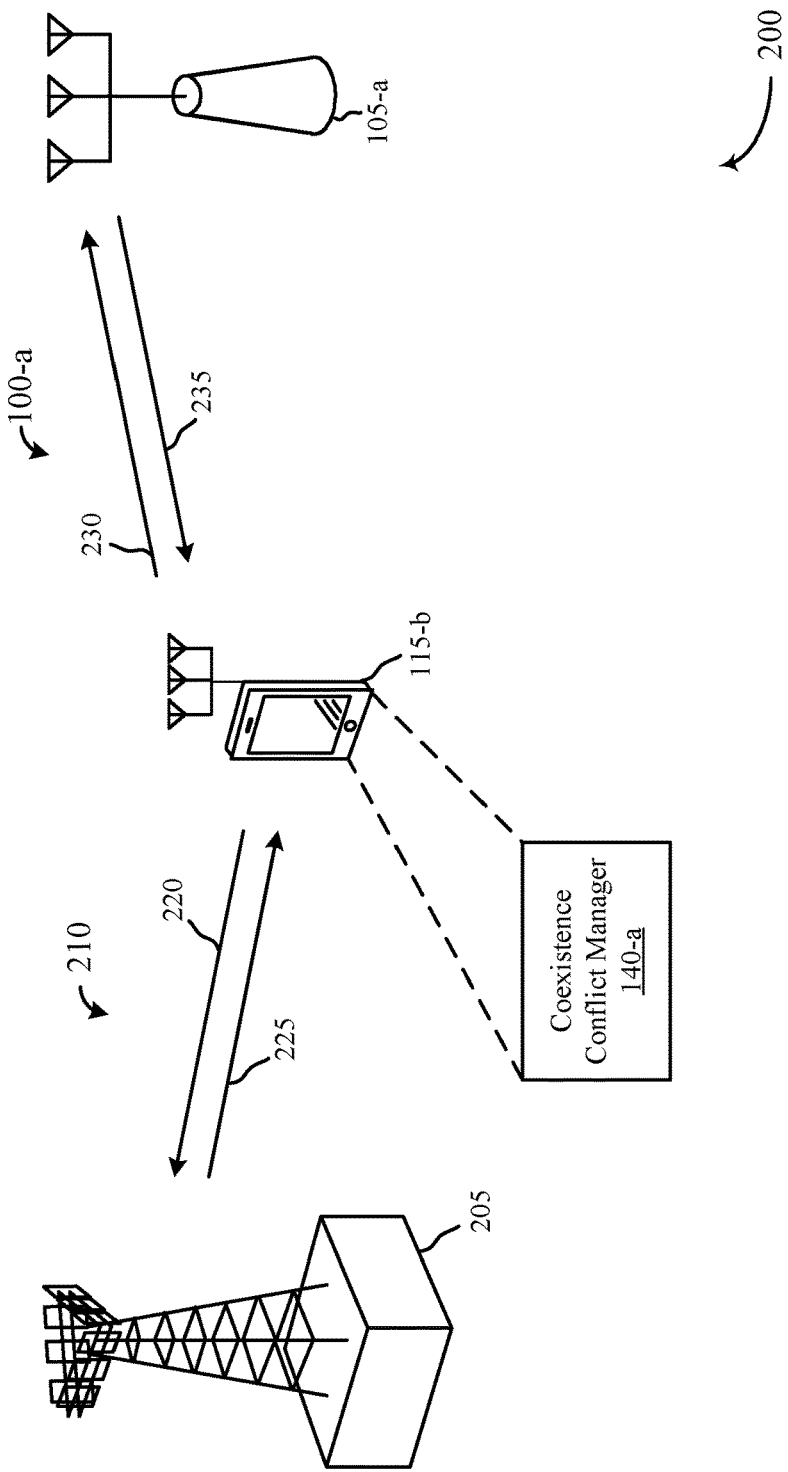
FIG. 2 shows a diagram of a wireless device communicating over two different wireless networks, in accordance with various aspects of the present disclosure.

FIG. 2 shows a diagram 200 of a STA 115-b communicating over two different wireless networks, in accordance with various aspects of the present disclosure. The diagram 200 includes the STA 115-b, an AP 105-a, and a BS 205. The STA 115-b may be an example of aspects of the STA 115 (including STA 115-a) of FIG. 1. The AP 105-a may be an example of aspects of the AP 105 described with reference to FIG. 1. The wireless communication system 100-a may be an example of aspects of the wireless communication system 100 described with reference to FIG. 1.

The STA 115-b may include two or more RATs that enable the STA 115-b to communicate over two or more different wireless communication systems. In the example of FIG. 1, the STA 115-b communicates with the AP 105-a over the wireless communication system 100-a (e.g., a WLAN or other network). The STA 115-b also communicates with the BS 205 over a wireless communication system 210 (e.g., a Wide Area Network (WAN) or other network). The wireless communication system 210 may be an LTE network, other WAN (e.g., a network using cellular communication protocols), or another type of communications network. In some examples, the STA 115-b may communicate with a different AP or STA over the wireless communication system 210. However, for purposes of illustration, the STA 115-b is described as being in communication with the AP 105-a and the BS 205.

The BS 205 may wirelessly communicate with the STA 115-b and additional STAs 115. In some examples, the BS 205 may be referred to as a base transceiver station, a radio base station, an access point, a radio transceiver, a NodeB, an evolved Node B (eNB), a Home NodeB, a Home eNodeB, or some other suitable terminology. The BS 205 may be one of several different types (e.g., macro or small cell base stations). In some examples, the BS 205 connects with the STA 115-b using an LTE/LTE-A network. In LTE/LTE-A networks, the term eNB may be generally used to describe the BS 205. The wireless communication system 210 may be a Heterogeneous LTE/LTE-A network in which different types of eNBs provide coverage for various geographical regions. For example, each eNB or BS 205 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or BS, depending on context. In another example, the wireless communication system 210 may be an "LTE-U" system that uses LTE and/or LTE-Advanced communication technology at least partially in an unlicensed portion of the frequency spectrum (e.g., the unlicensed portion of spectrum traditionally used for WLAN (e.g., Wi-Fi) communications, such as the 2.4 GHz, 3.6 GHz, 5 GHz, 60 GHz, and/or 900 MHz frequency bands). The unlicensed spectrum may also include other frequency bands.

The wireless communication system 210 may include communication links 220 and 225. The communication link 220 may include uplink (UL) transmissions from the STA 115-b to the BS 205. The communication link 225 may include downlink (DL) transmissions from the BS 205 to the STA 115-b. Similarly, the wireless communication system 100-a may include communication links 230 and 235. The communication link 230 may include UL transmissions from the STA 115-b to the AP 105-a. The communication link 235 may include DL transmissions from the AP 105-a to the STA 115-b. The DL transmissions may also be called forward link transmissions while the UL transmissions may also be called reverse link transmissions. Each communication link 220, 225, 230, and 235 may include carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, and the like. The communication links 220, 225, 230, and 235 may transmit bidirectional communications using frequency-division duplexing (FDD) (e.g., using paired spectrum resources) or time-division duplexing (TDD) operation (e.g., using unpaired spectrum resources). Frame structures for FDD (e.g., frame structure type 1) and TDD (e.g., frame structure type 2) may be defined.

In some examples of the wireless communication system 100, BS 205 and STA 115-b may include multiple antennas for employing antenna diversity schemes to improve communication quality and reliability between the BS 205 and the STA 115-b. Additionally or alternatively, the BS 205 and the STA 115-b may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, and the like. The terms "carrier," "component carrier," "cell," and "channel" may be used interchangeably herein. A STA 115-b may be configured with multiple downlink CCs and uplink CCs for carrier aggregation. Carrier aggregation may be used with both FDD and TDD component carriers.

The STA 115-b may include a coexistence conflict manager 140-a, which may be one or more aspects of the coexistence conflict manager 140-a shown in FIG. 1. The coexistence conflict manager 140-a may maintain a database or table that identifies potential conflicts between RATs of the STA 115-b. The coexistence conflict manager 140-a may maintain a plurality of conflict entries. Each conflict entry may indicate a first frequency range associated with interference by a first RAT and a second frequency range associated with interference by a second RAT. Some of the conflict entries may indicate a first frequency range associated with interference by one of a plurality of component carriers of the first RAT operating in a carrier aggregation mode and a second frequency range associated with interference by a second RAT. In some examples, a subset of the conflict entries are organized into at least one intermodulation group. The STA 115-b, via the coexistence conflict manager 140-a, may identify a plurality of active coexistence conflicts between the first RAT and the second RAT based at least in part on the conflict entries and current radio conditions. The STA 115-b may also select one of the active coexistence conflicts for conflict mitigation. In some examples, the selected active coexistence conflict is a member of one of the intermodulation groups. The STA 115-b may perform the conflict mitigation or may provide another device, such as the AP 105-a or the BS 205, with information regarding conflict mitigation based on the selected active coexistence conflict.

Figure 3:
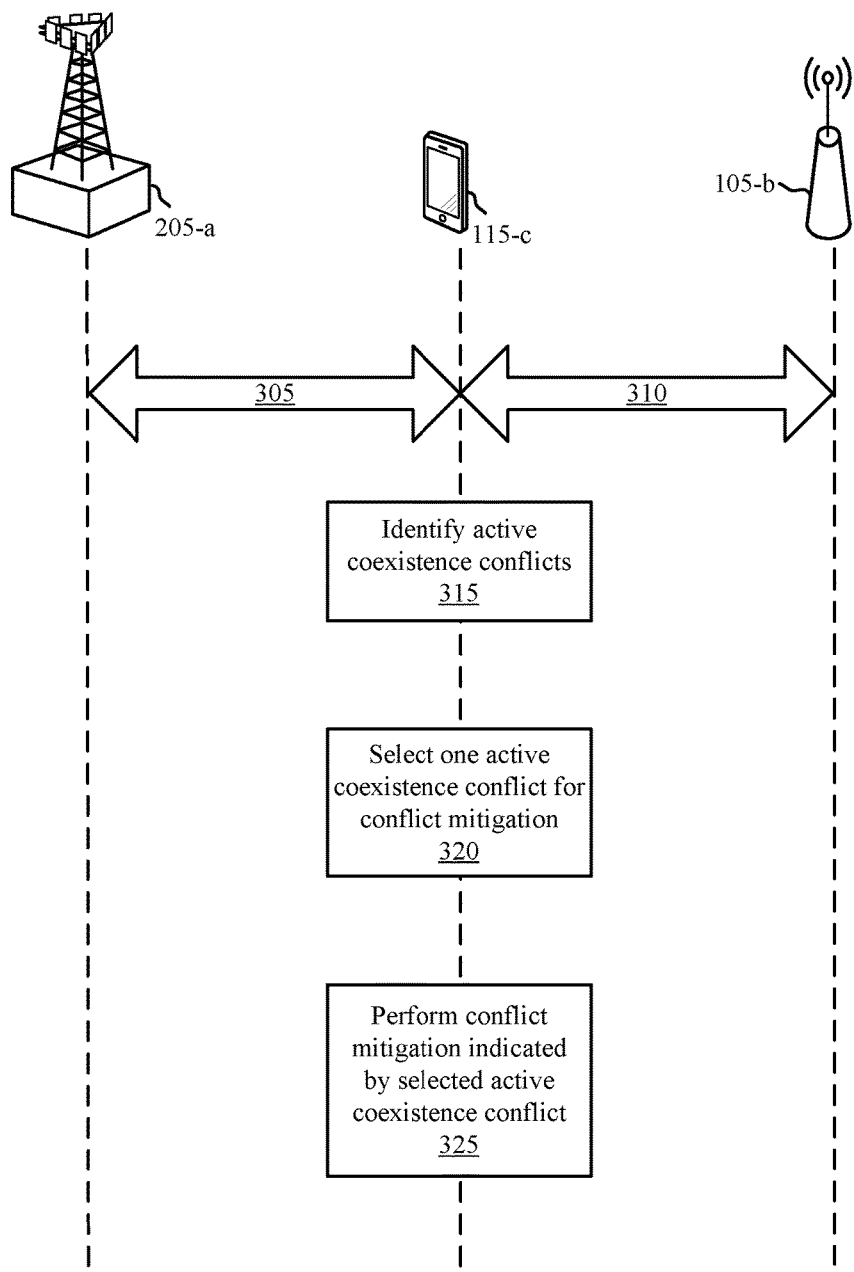
FIG. 3 is a flow diagram illustrating a process of identifying coexistence conflicts in a wireless network, in accordance with various aspects of the present disclosure.

FIG. 3 is a flow diagram illustrating a process 300 of identifying coexistence conflicts in a wireless network, in accordance with various aspects of the present disclosure. The process 300 includes a STA 115-c, an AP 105-b, and a BS 205-a. The STA 115-c may be an example of aspects of the STAs 115 of FIGS. 1 and 2. The AP 105-b may be an example of aspects of the AP 105 described with reference to FIGS. 1 and 2. The BS 205-a may be an example of aspects of the BS 205 described with reference to FIG. 2.

The STA 115-c may have two or more active RATs. As shown in FIG. 3, the STA 115-c has communications 305 with the BS 205-a over a first RAT and communications 310 with the AP 105-b over the second RAT. Some of the communications 305 and 310 may overlap in time. Due to the currently coexisting communications 305 and communications 310, one or more frequencies used with one RAT may interfere with one or more frequencies of the other RAT.

When the current radio conditions indicate a conflict is possible (e.g., two RATs are active), the STA 115-c may determine whether there are any active coexistence conflicts that could be mitigated. First, the STA 115-c may identify active coexistence conflicts (315). The STA 115-c may review a database of potential conflicts to identify active coexistence conflicts. The database may be a look-up table (which may be referred to as a victim table) that stores conflict entries which identify frequencies or component carriers of RATs that may interfere with each other.

From the identified active coexistence conflicts, the STA 115-c may select one for conflict mitigation (320). The selection may be based on one or more of several factors, including whether the active coexistence conflict is part of an intermodulation group and a priority assigned to the active coexistence conflict. In some examples, the priority assigned to the active coexistence conflict may be based at least in part on received signal strength indicator (RSSI) of one or more RATs, LTE duty cycle, and an operating mode (e.g., peer-to-peer (P2P) versus AP mode) of the STA 115-c for one or more of the RATs. The STA 115-c may perform an action to mitigate the conflict corresponding to the selected active coexistence conflict (325). The conflict entry associated with the selected active coexistence conflict may specify the mitigation action to be taken. Examples of mitigation actions that may be specified in a conflict entry include adjusting the transmit power of one or more RATs (e.g., increase the transmit power of the victim RAT and/or decrease the transmit power of an aggressor RAT), turning off one or more of the RATs, delaying or advancing a transmission of one or more of the RATs, requesting or moving to a different channel for one or more of the RATs, and similar actions that reduce the likelihood of coexistence interference.

Figure 4:
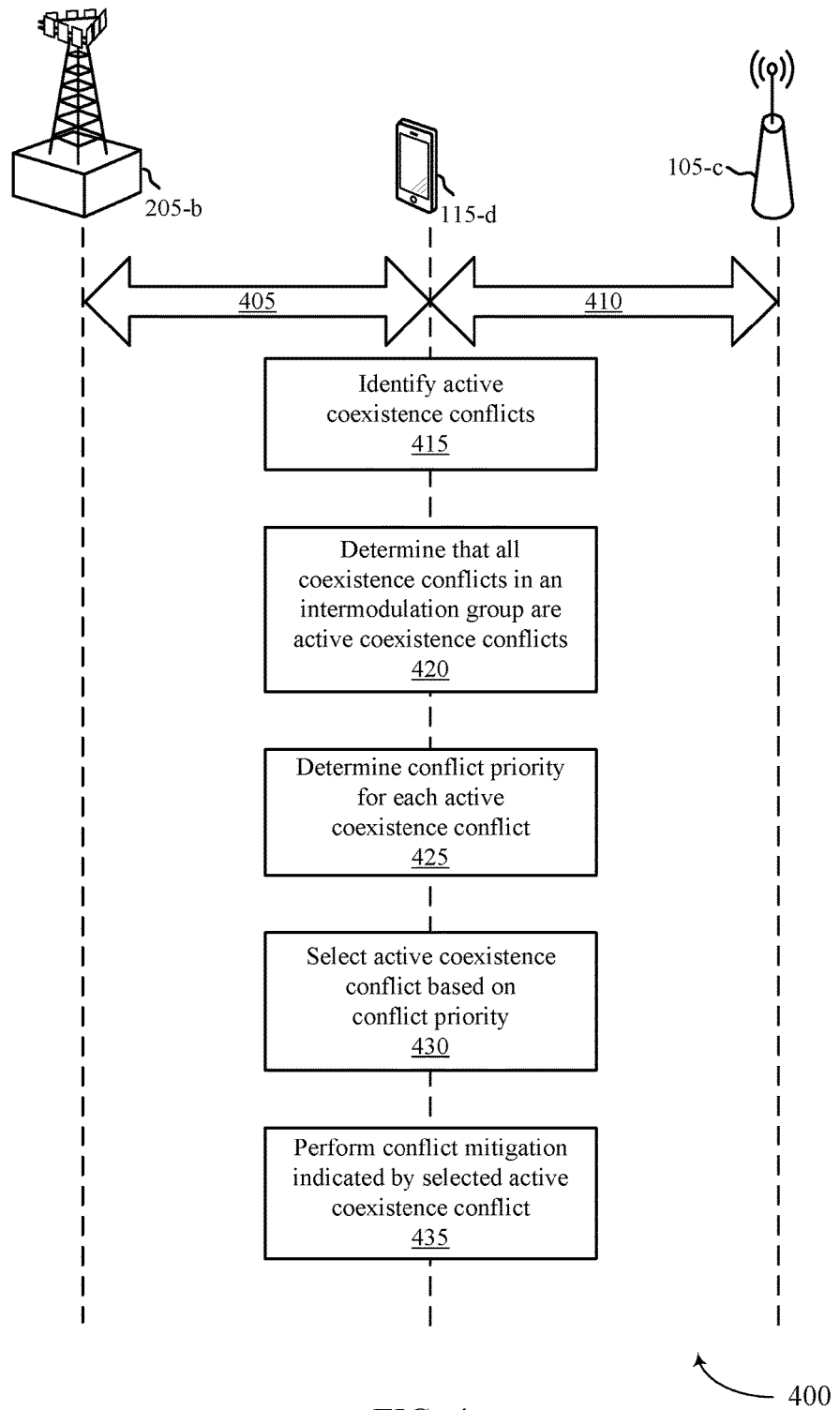
FIG. 4 is a flow diagram illustrating a process of selecting a coexistence conflict for mitigation, in accordance with various aspects of the present disclosure.

FIG. 4 is a flow diagram illustrating a process 400 of selecting a coexistence conflict for mitigation, in accordance with various aspects of the present disclosure. The process 400 includes a STA 115-d, an AP 105-c, and a BS 205-b. The STA 115-d may be an example of aspects of the STAs 115 of FIGS. 1-3. The AP 105-c may be an example of aspects of the AP 105 described with reference to FIGS. 1-3. The BS 205-b may be an example of aspects of the BS 205 described with reference to FIGS. 2 and 3.

Similar to FIG. 3, the STA 115-d has two or more active RATs and has communications 405 with the BS 205-b over a first RAT and communications 410 with the AP 105-c over a second RAT. These communications 405 and 410 may result in one or more active coexistence conflicts. The STA 115-c may identify active coexistence conflicts (415) for the current radio conditions by reviewing conflict entries stored in a victim table, for example.

The STA 115-c may determine that all coexistence conflicts in an intermodulation group are active coexistence conflicts (420). Coexistence conflicts may be aggregated into an intermodulation group because those frequencies or component carriers may cause harmonics or intermodulation issues among the group. Each conflict entry in the victim table may have a group number that identifies the group of the coexistence conflict. If the group number for a conflict entry is 0, then that coexistence conflict is not in a group. All other numbers for the group number may indicate a group. All coexistence conflicts with the same group number are in a group.

In some examples, every coexistence conflict in an intermodulation group must be active for the intermodulation group to be considered a valid group. That is, if one coexistence conflict in an intermodulation group is not active, all active coexistence conflicts in that intermodulation group will be invalid. Invalidating an active coexistence conflict may include marking the intermodulation group as invalid and removing those active coexistence conflicts from consideration for selection. If all members of the intermodulation group are active coexistence conflicts, then each active coexistence conflict may be qualified for consideration for selection as the selected active coexistence conflict. If an active coexistence conflict is not in an intermodulation group (e.g., the conflict entry lists "0" for intermodulation group), it may be considered a valid active coexistence conflict.

Table 1 illustrates an example victim table. The index uniquely identifies each conflict entry. Each conflict entry indicates a first frequency range associated with interference by a first RAT and a second frequency range associated with interference by a second RAT. Table 1 provides an example where the first RAT is a WWAN technology (WWAN Tech) and the second RAT is a WLAN technology. Each conflict entry may also include a mitigation policy (P0-P5 in Table 1) that identifies the mitigation actions to be taken if the conflict entry is selected. The conflict entries also indicate a group number. For example, in Table 1, conflict entries 0 and 5 have a group number set to 0, meaning these conflict entries are not in a group. Conflict entries 1 and 2 are in intermodulation group 1. Similarly, conflict entries 3 and 4 are in intermodulation group 2.

TABLE 1

| Index | WWAN Tech | WWAN Freq. Range (MHz) | WWAN Direction | WLAN Freq. Range (MHz) | Policy | Group Number |
|---|---|---|---|---|---|---|
| 0 | LTE | 2335-2345 | DL | 2400-2500 | P0 | 0 |
| 1 | LTE | 2325-2335 | DL | 2400-2500 | P1 | 1 |
| 2 | LTE | 2350-2370 | DL | 2400-2500 | P2 | 1 |
| 3 | LTE | 2300-2330 | DL | 2400-2500 | P3 | 2 |
| 4 | LTE | 2375-2400 | DL | 2400-2500 | P4 | 2 |
| 5 | LTE | 2375-2400 | UL | 2400-2500 | P5 | 0 |

Once the valid active coexistence conflicts have been identified, the STA 115-*c* may determine a conflict priority for each valid active coexistence conflict (425). Assigning a priority for each valid active coexistence conflict may assist the STA 115-*c* in selecting which active coexistence conflict to mitigate, especially if there are multiple active coexistence conflicts within a currently used operating frequency. The priorities may be assigned based on which conflicts may cause the most damage to communications (e.g., interfering with critical control information, substantial interference with messages, etc.).

The priority may be determined based on a number of factors, including whether the communication is an UL or DL, a type of conflict match (e.g., a center frequency match), and an amount of frequency bandwidth (e.g., in MHz) that is overlapped. In some examples, some or all of these considerations may be taken into account into a single priority number. For example, a priority number may be a 32 bit unsigned integer that is divided into separate bit-fields for each factor considered. One example is a three bit-field integer that has a field to indicate if the communication is an UL, a second field for a match type, and a third field for the amount of overlap. Different weights may be assigned to different factors. If a coexistence conflict is invalid or inactive, the STA 115-*c* may define its priority number as 0.

From the valid active coexistence conflicts, the STA 115-*c* may select one for conflict mitigation based on the assigned priorities (430). The STA 115-*c* may select an active coexistence conflict because it has the highest priority, for example. The STA 115-*c* may perform an action to mitigate the conflict corresponding to the selected active coexistence conflict (435).

Figure 5A:
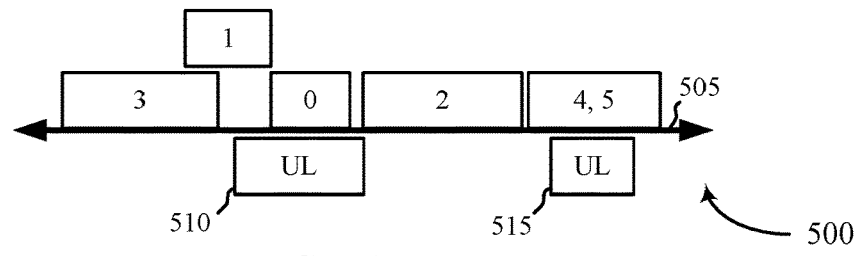
FIGS. 5A-5E are conceptual diagrams illustrating example coexistence conflicts, in accordance with various aspects of the present disclosure.

FIGS. 5A-5E are conceptual diagrams illustrating example coexistence conflicts, in accordance with various aspects of the present disclosure. FIG. 5A shows a diagram 500 that illustrates an active coexistence conflict for a single carrier. The diagram 500 provides a visual representation of the victim table shown in Table 1. Each conflict entry 0-5 is illustrated along a frequency axis 505 according to the frequency range of the first RAT in the conflict entry. All example frequencies provided for the examples of FIGS. 5A-5E refer to megahertz (MHz).

In this example, a first RAT (e.g., LTE) may operate DL traffic 510 in the frequency range 2330-2350 (with a center frequency of 2340). The first RAT may operate UL traffic 515 in the frequency range 2380-2390 (with a center frequency of 2385). The active coexistence conflicts are those that overlap with the DL traffic 510 and the UL traffic 515, namely conflict entries 0, 1, and 5. The conflict entry 4 is not active because that conflict entry corresponds only to DL traffic and thus does not interfere with the UL traffic 515.

In this example, a second RAT (e.g., Wi-Fi) is operating in a frequency range of 2420-2434. Here, the second RAT matches using a complete overlap. That is, an active frequency range completely overlaps the conflict range. Because the Wi-Fi is operating in the range 2420-2434, it completely overlaps the frequency range defined for the conflict entries of Table 1, given as 2400-2500.

For each active coexistence conflict, the coexistence conflict manager, such as the coexistence conflict manager 140 of FIGS. 1 and 2, may determine a priority. If a coexistence conflict is not active or invalid, the priority is assigned zero. For illustrative purposes, the priority assigned herein is based on multiplying the following factors by different weighting coefficients and adding the results. One example priority equation may be provided an uplink condition multiplied by an uplink coefficient, plus a conflict type multiplied by a type coefficient, plus an amount of frequency overlap. The uplink condition may be assigned 1 if the traffic direction is uplink or 0 if the traffic direction is downlink. The uplink coefficient may be 1000, for example. The type coefficient may be assigned 1 if the center frequency is conflicted or 0 if the center frequency is not conflicted. The type coefficient may be 100, for example. The values of the coefficients may be selected based on one or more factors, such as a priority of the parameter (e.g., UL data may be given higher priority than a center frequency), importance of signal quality, importance of particular transmissions or data types, RAT type, and the like.

Priority values may be determined by summing the coefficients. For example, the coefficient for the UL/DL may be selected as 1000, the coefficient for the center frequency may be 100, and the coefficient for the overlap may be 1. This is only one, non-limiting example of selected coefficients. In the example described herein, the priority for conflict entry 0 (DL, in center frequency, 10 MHz overlap) may be 0+100+10, resulting in a priority of 110. The priority for conflict entry 1 (DL, not in center frequency, 5 MHz overlap) may be 0+0+5, resulting in a priority of 5. The priority for conflict entry 5 (UL, in center frequency, 10 MHz overlap) may be 1000+100+10, resulting in a priority of 1110. In another example, the coefficients are selected to be 5 for the UL/DL, 8 for the center frequency, and 3 for the offset. In this case the priority for conflict entry 1 would be 0+800+30=830, and the priority for conflict entry 5 would be 0+0+15=15.

However, if there are any intermodulation groups, each conflict entry may be checked for validity. In this example, the active coexistence conflicts are 0, 1, and 5. In Table 1, 0 and 5 are not in intermodulation groups (i.e., their group number is 0). However, the conflict entry 1 is in a group, namely group 1. Group 1 also includes conflict entry 2. Because conflict entry 2 is not active, conflict entry 1 is invalidated because there is an inactive conflict entry in its group. If a conflict entry is invalid, then its priority may be set to 0.

Thus, the valid active coexistence conflicts include 0 and 5. The priority for 0 is 110 and the priority for 5 is 1110. The conflict entry 5 may be selected for conflict mitigation because it has the highest priority. Thus, coexistence conflict manager may select the policy P5 for the primary component carrier (PCC) of the LTE based on conflict entry 5 having the highest priority.

Figure 5B:
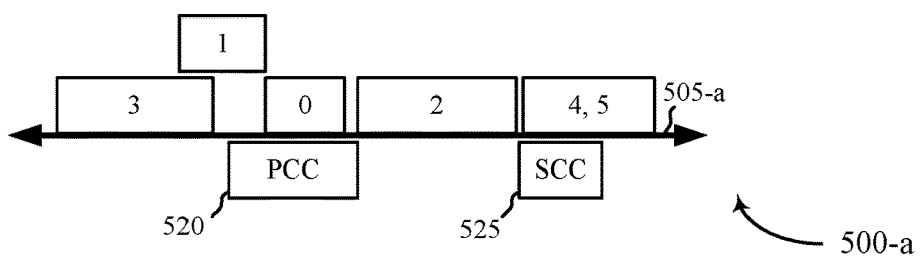

FIG. 5B shows a diagram 500-*a* that illustrates an active coexistence conflict for two carrier components. The diagram 500-*a* provides a visual representation of the victim table shown in Table 1. Each conflict entry 0-5 is illustrated along a frequency axis 505-*a* according to the frequency range of the first RAT in the conflict entry. In this example, a first RAT (e.g., LTE) is operating DL traffic using a PCC 520 in the frequency range 2330-2350 (with a center frequency of 2340). The first RAT is operating DL traffic using a secondary component carrier (SCC) 525 in the frequency range 2375-2385 (with a center frequency of 2380).

The active coexistence conflicts are those that overlap with the PCC 520 and the SCC 525, namely conflict entries 0, 1, and 4. The conflict entry 5 is not active because that conflict entry corresponds to UL traffic. For each active coexistence conflict, the coexistence conflict manager may determine a priority. The priority for conflict entry 0 (DL, in center frequency, 10 MHz overlap) may be 0+100+10, resulting in a priority of 110. The priority for conflict entry 1 (DL, not in center frequency, 5 MHz overlap) may be 0+0+5, resulting in a priority of 5. The priority for conflict entry 4 (DL, in center frequency, 10 MHz overlap) may be 0+100+10, resulting in a priority of 110.

Next, each conflict entry may be checked for validity based on its intermodulation group. For group validation, conflict entry 0 is checked and validated because it is not in a group. Conflict entry 1 is checked and invalidated because it is in a group with conflict entry 2, which is inactive. Similarly, conflict entry 4 is invalidated because it is in a group with inactive conflict entry 3. Thus, the coexistence conflict manager selects the policy P0 for the PCC 520 and no policy for the SCC 525.

Figure 5C:
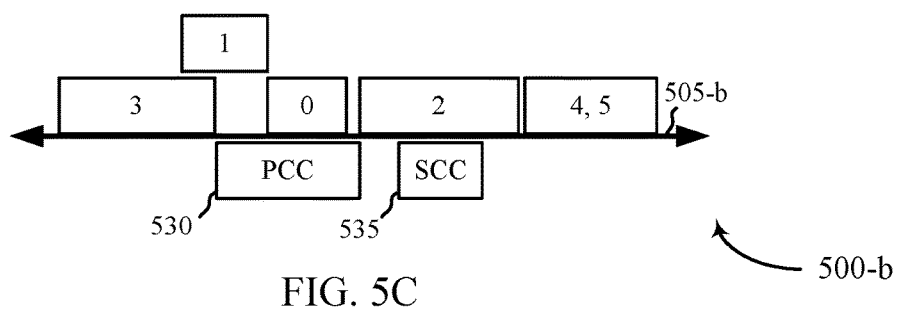

FIG. 5C shows a diagram 500-b that illustrates an active coexistence conflict for two carrier components. The diagram 500-b provides a visual representation of the victim table shown in Table 1. Each conflict entry 0-5 is illustrated along a frequency axis 505-a according to the frequency range of the first RAT in the conflict entry. In this example, a first RAT (e.g., LTE) is operating DL traffic using a PCC 530 in the frequency range 2330-2350 (with a center frequency of 2340). The first RAT is operating DL traffic using a SCC 535 in the frequency range 2355-2365 (with a center frequency of 2360).

The active coexistence conflicts are those that overlap with the PCC 530 and the SCC 535, namely conflict entries 0, 1, and 2. For each active coexistence conflict, the coexistence conflict manager may determine a priority. The priority for conflict entry 0 (DL, in center frequency, 10 MHz overlap) may be 0+100+10, resulting in a priority of 110. The priority for conflict entry 1 (DL, not in center frequency, 5 MHz overlap) may be 0+0+5, resulting in a priority of 5. The priority for conflict entry 2 (DL, in center frequency, 10 MHz overlap) may be 0+100+10, resulting in a priority of 110.

Next, each conflict entry may be checked for validity based on its intermodulation group. For group validation, conflict entry 0 is checked and validated because it is not in a group. Conflict entries 1 and 2 are both in the same intermodulation group 1 and are both active. There are no inactive conflict entries in intermodulation group 1. Thus, the coexistence conflict manager selects the policy P0 for the PCC 530 and the policy P1 for the SCC 535.

Figure 5D:
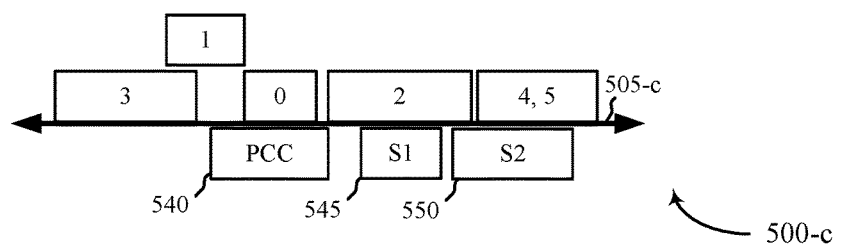

FIG. 5D shows a diagram 500-c that illustrates an active coexistence conflict for three carrier components. The diagram 500-c provides a visual representation of the victim table shown in Table 1. Each conflict entry 0-5 is illustrated along a frequency axis 505-c according to the frequency range of the first RAT in the conflict entry. In this example, a first RAT (e.g., LTE) is operating DL traffic using a PCC 540 in the frequency range 2315-2335 (with a center frequency of 2325). The first RAT is operating DL traffic using a SCC1 545 in the frequency range 2355-2365 (with a center frequency of 2360) and DL traffic using a SCC2 550 in the frequency range 2365-2385 (with a center frequency of 2375).

The active coexistence conflicts are those that overlap with the PCC 530 and the SCC 535, namely conflict entries 1-4. The priority for conflict entry 1 (DL, in center frequency, 10 MHz overlap) may be 0+100+10, resulting in a priority of 110. The priority for conflict entry 2 for the SCC1 545 (DL, in center frequency, 10 MHz overlap) may be 0+100+10, resulting in a priority of 110. The priority for conflict entry 2 for the SCC2 550 (DL, not in center frequency, 5 MHz overlap) may be 0+0+5, resulting in a priority of 5. The priority for conflict entry 3 for the PCC 540 (DL, in center frequency, 15 MHz overlap) may be 0+100+15, resulting in a priority of 115. The priority for conflict entry 4 for the SCC2 550 (DL, in center frequency, 10 MHz overlap) may be 0+100+10, resulting in a priority of 110.

Next, each conflict entry may be checked for validity based on its intermodulation group. For group validation, conflict entries 1 and 2 are both in the same intermodulation group 1 and are both active. There are no inactive conflict entries in intermodulation group 1. Conflict entries 3 and 4 are both in the same intermodulation group 2 and are both active and there are also no other inactive conflict entries. Thus, the coexistence conflict manager selects the highest priority for each component carrier. Thus, the coexistence conflict manager selects the policy P3 for the PCC 540, P2 for the SCC1 545, and P4 for the SCC2 550.

Figure 5E:
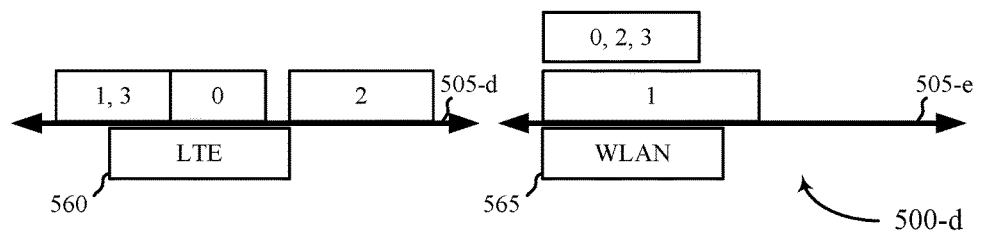

FIG. 5E shows a diagram 500-d that illustrates an active coexistence conflict for two different RATs. The diagram 500-c provides a visual representation of the table shown in Table 2. Table 2 illustrates part of a victim table as well as indicates whether the conflict entry is active and provides the total priority. Each conflict entry 0-3 is illustrated along a frequency axis 505-d according to the frequency range of the first RAT in the conflict entry. Each conflict entry 0-3 is also illustrated along a frequency axis 505-e according to the frequency range of the second RAT in the conflict entry.

In this example, a first RAT (e.g., LTE) is operating DL/UL traffic 560 in the frequency range 2330-2350 (with a center frequency of 2340). The second RAT (e.g., Wi-Fi) is operating traffic 565 in the frequency range 2401-2423 (channel 1).

TABLE 2

| Index | WWAN Freq. Range (MHz) | WLAN Freq. Range (MHz) | Policy | Group Number | Active? | Total Priority |
|---|---|---|---|---|---|---|
| 0 | 2335-2345 | 2400-2423 | P0 | 0 | Yes | 110 + 800 = 910 |
| 1 | 2325-2335 | 2400-2438 | P1 | 0 | Yes | 5 + 500 = 505 |
| 2 | 2350-2370 | 2400-2423 | P2 | 0 | No | 0 |
| 3 | 2325-2335 | 2400-2423 | P3 | 0 | Yes | 5 + 790 = 795 |

Table 2 illustrates which conflict entries are active and their respective priorities. The policy for the first RAT may be selected as P0 and the policy for the second RAT may be selected as P3.

For examples involving WLAN and carrier aggregation, several factors may be considered. First, the worse conflict may be selected for conflict mitigation. Also, two or more mitigation policies may be combined for mitigating WLAN conflicts. The coexistence conflict manager may also manage multiple active simultaneous policies on the WLAN side. Further, hardware may be used to support identifying RATs on particular parts of a network, device, or system, such as the WCI2 data-plane. Additionally, other priorities may be used in determining a conflict, such as a Windows Connect Now (WCN) priority.

The specific examples described in FIGS. 5A-5E are provided for illustrative purposes only and are not meant to be limiting. Other methods and techniques for determining priority and selecting an active coexistence conflict may be used in other examples. Further, if no active coexistence conflict is valid, no conflict may be picked for that carrier.

Figure 6:
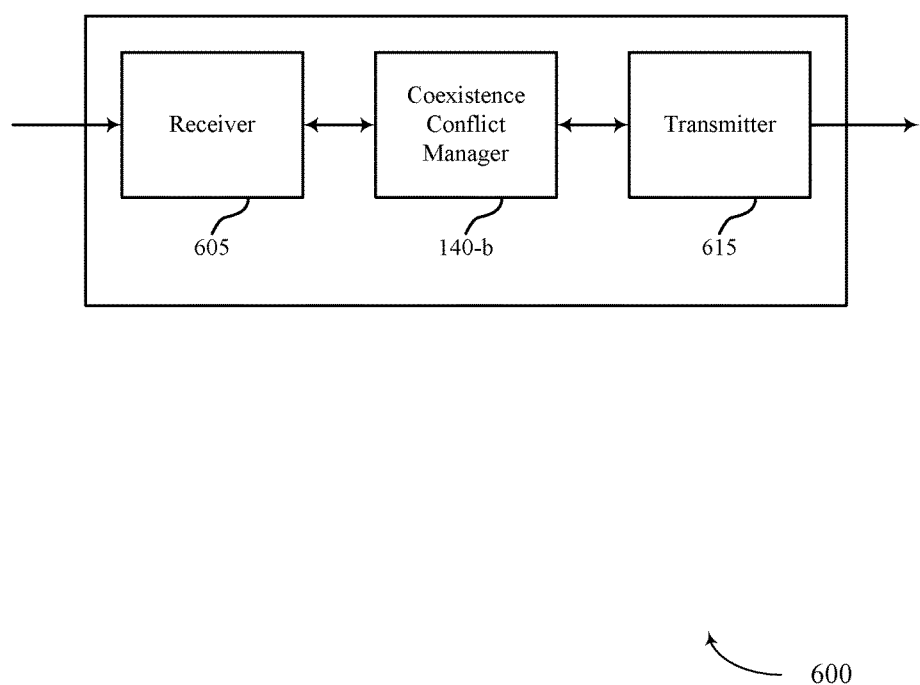
FIGS. 6-8 show block diagrams of a wireless device for identifying RAT coexistence conflicts in accordance with various aspects of the present disclosure.

FIG. 6 shows a block diagram of a wireless device 600 for identifying RAT coexistence conflicts in accordance with various aspects of the present disclosure. The wireless device 600 may be an example of aspects of a STA 115 described with reference to FIGS. 1-5. The wireless device 600 may include a receiver 605, a coexistence conflict manager 140-b, and a transmitter 615. The wireless device 600 may also include one or more processors, memory coupled with the one or more processors, and instructions stored in the memory that are executable by the one or more processors to enable the one or more processors to perform the identifying RAT coexistence conflicts features discussed herein. The instructions stored in the memory and executable by the one or more processors may enable the one or more processors to implement the algorithms of the coexistence conflict manager 140-b. The algorithms of the coexistence conflict manager 140-b may be the algorithms shown in FIGS. 3, 4, and 10-13, in addition to the below description of the functions performed by the coexistence conflict manager 140-b. Each of these components may be in communication with each other.

The receiver 605 may receive or detect information such as packets, user data, or control information associated with various information channels (e.g., control channels, data channels, and information related to identifying RAT coexistence conflicts, etc.). The receiver 605 may pass on information related to identifying RAT coexistence conflicts to the coexistence conflict manager 140-b and to other components of wireless device 600. In some examples, the information related to identifying RAT coexistence conflicts may include an indication of whether signals using the RAT are currently being received and, if so, a frequency range or band over which signals are currently being received using the RAT. The wireless device 600 may include more than one of receiver 605, such as a first receiver for a first RAT and a second receiver for a second RAT, and each of the receivers may provide information about its respective RAT to the coexistence conflict manager 140-b. In other examples, the wireless device 600 may include more than two receivers.

The transmitter 615 may transmit signals received from other components of the wireless device 600. In some examples, the transmitter 615 may be collocated with the receiver 605 in a transceiver module. The transmitter 615 may include a single antenna, or may include multiple antennas. The transmitter 615 may pass on information related to identifying RAT coexistence conflicts to the coexistence conflict manager 140-b and to other components of wireless device 600. In some examples, the information related to identifying RAT coexistence conflicts may include an indication of whether signals using the RAT are currently being transmitted and, if so, a frequency range or band over which signals are currently being transmitted using the RAT. In some examples, the wireless device 600 may include more than one of transmitter 615, such as a first transmitter for a first RAT and a second transmitter for a second RAT. In other examples, the wireless device 600 may include more than two transmitters.

The coexistence conflict manager 140-b may identify one or more coexistence conflicts occurring at the wireless device 600. The coexistence conflict manager 140-b may maintain a plurality of conflict entries, each conflict entry indicating a first frequency range associated with interference by a first RAT and a second frequency range associated with interference by a second RAT. As discussed above, some of the conflict entries may be organized into at least one intermodulation group. The coexistence conflict manager 140-b may identify multiple active coexistence conflicts between the first RAT and the second RAT based at least in part on the conflict entries and current radio conditions. The current radio conditions may include the information related to identifying RAT coexistence conflicts that the coexistence conflict manager 140-b receives from the receiver 605 and the transmitter 615. In some examples, multiple conflict entries are organized into an intermodulation group, and the coexistence conflict manager 140-b may identify one of the conflict entries in the intermodulation group as active if the conditions are satisfied for identifying all of the conflict entries in the intermodulation group as active.

The coexistence conflict manager 140-b may select one of the active coexistence conflicts for conflict mitigation. The selection may be on the basis of a priority determined for each conflict entry, as discussed above. In some cases, one of the RATs is operating in a carrier aggregation mode using multiple component carriers. In such a case, when the coexistence conflict manager 140-b is determining whether a conflict entry is active the coexistence conflict manager 140-b may separately assess whether each component carrier of the RAT is operating in the frequency range specified by the conflict entry for that RAT.

Figure 7:
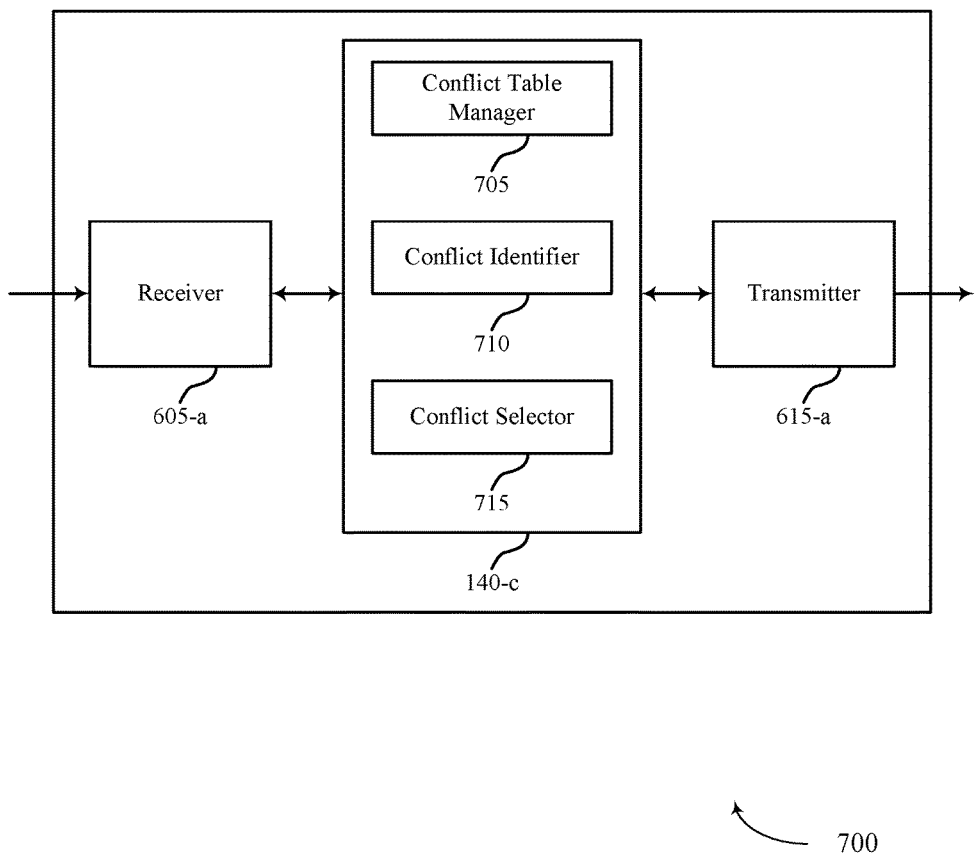

FIG. 7 shows a block diagram of a wireless device 700 for identifying RAT coexistence conflicts in accordance with various aspects of the present disclosure. The wireless device 700 may be an example of aspects of a wireless device 600 or a STA 115 described with reference to FIGS. 1-6. The wireless device 700 may include a receiver 605-a, a coexistence conflict manager 140-c, and a transmitter 615-a. The wireless device 700 may also include one or more processors, memory coupled with the one or more processors, and instructions stored in the memory that are executable by the one or more processors to enable the one or more processors to perform the identifying RAT coexistence conflicts features discussed herein. The instructions stored in the memory and executable by the one or more processors may enable the one or more processors to implement the algorithms of the coexistence conflict manager 140-c. The algorithms of the coexistence conflict manager 140-c may be the algorithms shown in FIGS. 3, 4, and 10-13, in addition to the below description of the functions performed by the coexistence conflict manager 140-c. Each of these components may be in communication with each other. The coexistence conflict manager 140-c may also include a conflict table manager 705, a conflict identifier 710, and a conflict selector 715, each of which may be implemented as one or more processors coupled with memory and configured to execute instructions stored on the memory to implement portions of the algorithms of the coexistence conflict manager 140-*c*.

The receiver 605-*a* may receive information wirelessly over at least the first RAT and the second RAT, and may pass on information to the coexistence conflict manager 140-*c* related to the identification of RAT coexistence conflicts. The transmitter 615-*a* may transmit signals received from other components of wireless device 700, and may also pass on information to the coexistence conflict manager 140-*c* related to the identification of RAT coexistence conflicts.

The coexistence conflict manager 140-*c* may perform the operations described with reference to FIG. 6 with respect to the identification of RAT coexistence conflicts. More specifically, the conflict table manager 705 may maintain a plurality of conflict entries, each conflict entry indicating a first frequency range associated with interference by a first RAT and a second frequency range associated with interference by a second RAT. In some cases, a subset of the conflict entries are organized into at least one intermodulation group as described with reference to FIGS. 2-5. In some examples, the plurality of conflict entries additional frequency ranges associated with up to n RATs, where n is a positive integer.

In some examples, at least one of the conflict entries indicates a frequency range associated with interference by one of a plurality of component carriers of the first RAT operating in a carrier aggregation mode. The conflict table manager 705 may also maintain a plurality of conflict entries, each conflict entry indicating a first frequency range associated with interference by one of a plurality of component carriers of a first RAT operating in a carrier aggregation mode and a second frequency range associated with interference by a second RAT, which may or may not be operating in an a carrier aggregation mode. In some examples, one or more subsets of the conflict entries are organized into interdependent intermodulation groups.

The conflict identifier 710 may identify a plurality of active coexistence conflicts between the first RAT and the second RAT based at least in part on the conflict entries and current radio conditions as described with reference to FIGS. 2-5. The conflict identifier 710 may also determine that the current radio conditions indicate that the first and second RATs are active. The conflict identifier 710 may also identify at least one active coexistence conflict between the component carrier of the first RAT and the second RAT based at least in part on the conflict entries and current radio conditions.

In some cases, identifying the plurality of active coexistence conflicts involves determining, for each conflict entry, whether the first RAT is currently operating within a frequency range specified by the conflict entry for the first RAT while the second RAT is concurrently operating within a frequency range specified by the conflict entry for the second RAT. When a RATs utilizes carrier aggregation to operate over multiple component carriers (each component carrier having a separately defined frequency range), the conflict identifier 710 may ascertain whether any of the component carriers of a RAT is currently operating within the frequency range specified by the conflict entry for that RAT.

In examples where the conflict entries are organized into intermodulation groups, none of the conflict entries in a given intermodulation group may be identified as active unless the conditions for all of the conflict entries in that intermodulation group are concurrently satisfied. The conflict identifier 710 may also identify a plurality of active coexistence conflicts between the first RAT and the second RAT based at least in part on the conflict entries and current radio conditions.

The conflict selector 715 may select one of the active coexistence conflicts for conflict mitigation as described with reference to FIGS. 2-5. In some examples, the selection of one of the active coexistence conflicts for conflict mitigation may be based at least in part on an active coexistence conflict that may potentially cause the most interference between the two RATs. That is, the selected active coexistence conflict may cause the most interference between the two RATs among all the valid active coexistence conflicts. Additionally or alternatively, the selection of the one of the active coexistence conflicts may be based at least in part on the first RAT conflict priority and the second RAT conflict priority calculated for the selected active coexistence conflict. In some cases, the first RAT conflict priority and the second RAT conflict priority may be combined into an aggregate RAT conflict priority. The conflict selector 715 may then select the active coexistence conflict having the highest aggregate priority. In some examples, the selection of the at least one of the active coexistence conflicts may be based at least in part on a determination that all conflict entries in an intermodulation group are in the plurality of identified active coexistence conflicts.

Figure 8:
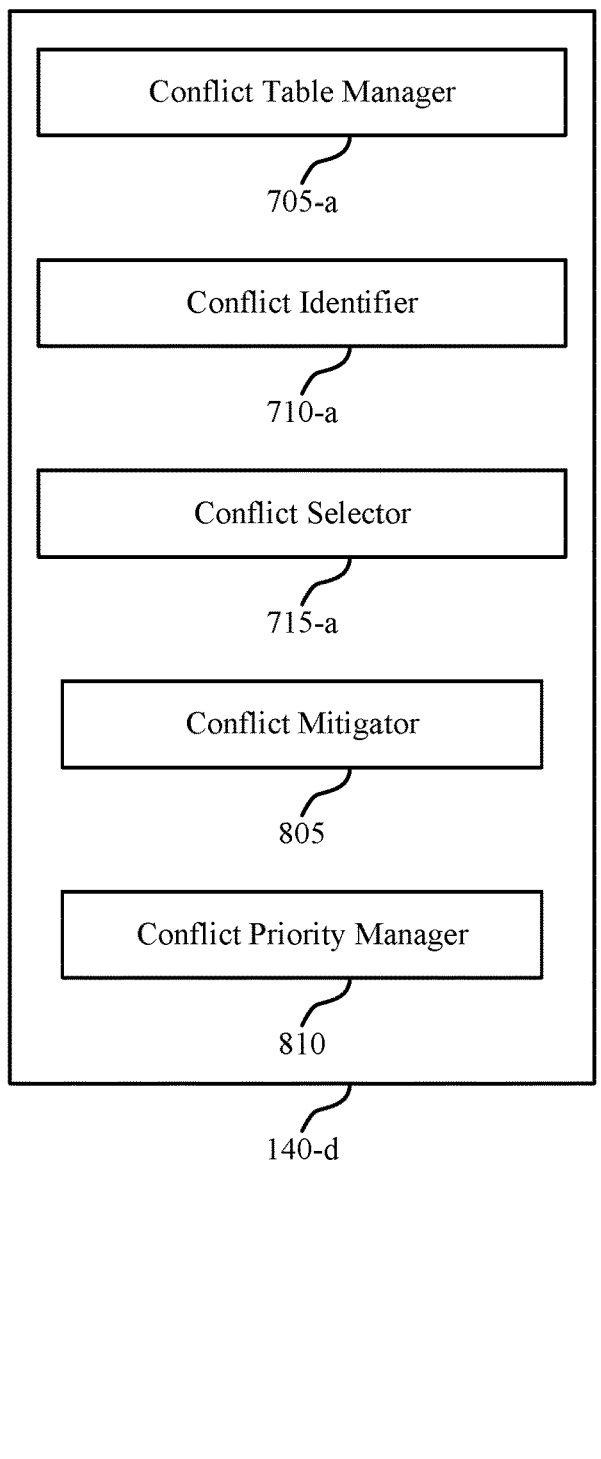

FIG. 8 shows a block diagram of a coexistence conflict manager 140-*b* which may be a component of a wireless device 600 or a wireless device 700 for identifying RAT coexistence conflicts in accordance with various aspects of the present disclosure. The coexistence conflict manager 140-*b* may be an example of aspects of a coexistence conflict manager 140 described with reference to FIGS. 6-7. The coexistence conflict manager 140-*b* may include a conflict table manager 705-*a*, a conflict identifier 710-*a*, and a conflict selector 715-*a*. Each of these components may perform the functions described with reference to FIG. 7. The coexistence conflict manager 140-*b* may also include a conflict mitigator 805, and a conflict priority manager 810. The conflict mitigator 805 and the conflict priority manager 810 may each be implemented as one or more processors, memory coupled with the one or more processors, and instructions stored in the memory that are executable by the one or more processors to enable the one or more processors to perform the identifying RAT coexistence conflicts features discussed herein. The instructions stored in the memory and executable by the one or more processors may enable the one or more processors to implement the algorithms of the coexistence conflict manager 140-*d*. The algorithms of the coexistence conflict manager 140-*d* may the algorithms shown in FIGS. 3, 4, and 10-13, in addition to the description of the functions performed by the coexistence conflict manager 140-*d*.

The conflict mitigator 805 may perform a mitigation policy associated with the selected active coexistence conflict as described with reference to FIGS. 2-5. A mitigation policy may include any action to mitigate interference between two or more coexisting RATs, such as reducing power, changing a transmit or receive frequency, ceasing transmission, changing transmit or receive times, or the like.

The conflict priority manager 810 may determine a conflict priority for each active coexistence conflict. In some examples, the conflict priority for each active coexistence conflict is an aggregate conflict priority based at least in part on a first conflict priority associated with the first RAT and a second conflict priority associated with the second RAT. In some examples, the conflict priority may be based at least in part on one or more of a type of conflict, a frequency offset, a direction of traffic, and a type of RAT. In some examples, the aggregate RAT conflict priority may be based at least in part on one or more of an addition of the first RAT conflict priority and the second RAT conflict priority, a concatenation of the first RAT conflict priority and the second RAT conflict priority, or a weighted combination of the first RAT conflict priority and the second RAT conflict priority.

Figure 9:
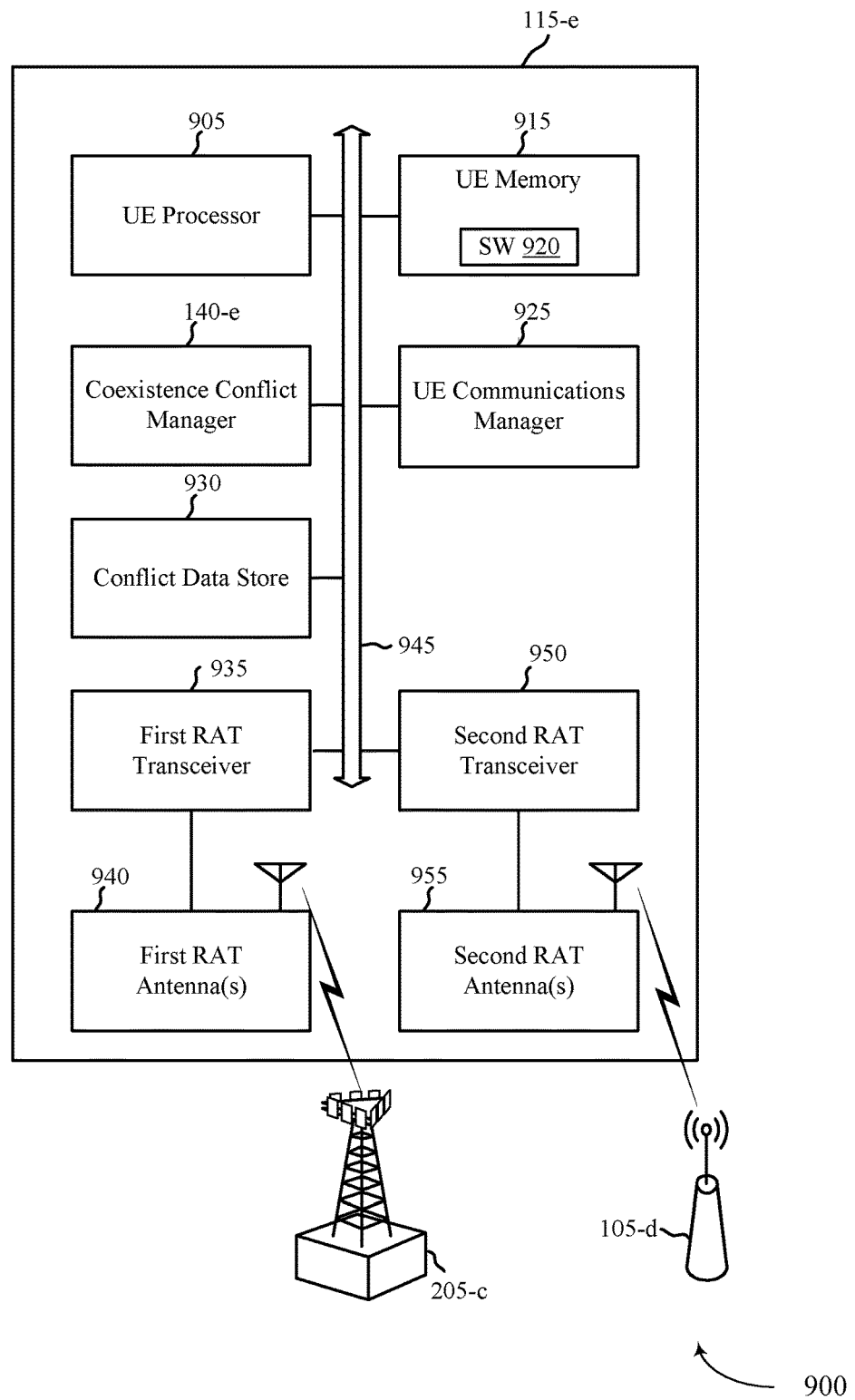
FIG. 9 illustrates a diagram of a system including a wireless device configured for identifying RAT coexistence conflicts in accordance with various aspects of the present disclosure.

FIG. 9 shows a diagram of a system including a wireless device 900 configured for identifying RAT coexistence conflicts in accordance with various aspects of the present disclosure. The wireless device 900 may be an example of a wireless device 600, a wireless device 700, or a STA 115 described with reference to FIGS. 1, 2 and 6-8. The wireless device 900 may include a coexistence conflict manager 140-e, which may be an example of a coexistence conflict manager 140 described with reference to FIGS. 6-8, and a conflict data store 930, which may store conflict entries for the identification of RAT coexistence conflicts according to the techniques described above. The wireless device 900 may also include a communications manager, which may control bi-directional voice and data communications with other devices. For example, wireless device 900 may communicate bi-directionally with BS 205-c or AP 105-d Wireless device 900 may also include a processor 905, and memory 915 (including software (SW) 920), a first RAT transceiver 935, first RAT antenna(s) 940, a second RAT transceiver 950, and second RAT antenna(s) 955. The processor 905, memory 915, first RAT transceiver 935, and second RAT transceiver 950 may communicate, directly or indirectly, with one another (e.g., via buses 945). The first RAT transceiver 935 and the second RAT transceiver 950 may communicate bi-directionally, via the first RAT antenna(s) 940 and the first RAT antenna(a) 955, or wired or wireless links, with one or more networks, as described above. For example, the first RAT transceiver 935 may communicate bi-directionally with BS 205-c, and the second RAT transceiver 950 may communicate bi-directionally with the AP 105-d. The first RAT transceiver 935 may include a modem to modulate the packets and provide the modulated packets to the antenna(s) 940 for transmission, and to demodulate packets received from the antenna(s) 940. While each of the first RAT transceiver 935 and the second RAT transceiver 950 is shown using a single antenna 940, 955, one or more of the first RAT transceiver 935 and the second RAT transceiver 950 may have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., identifying RAT coexistence conflicts, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.).

Figure 10:
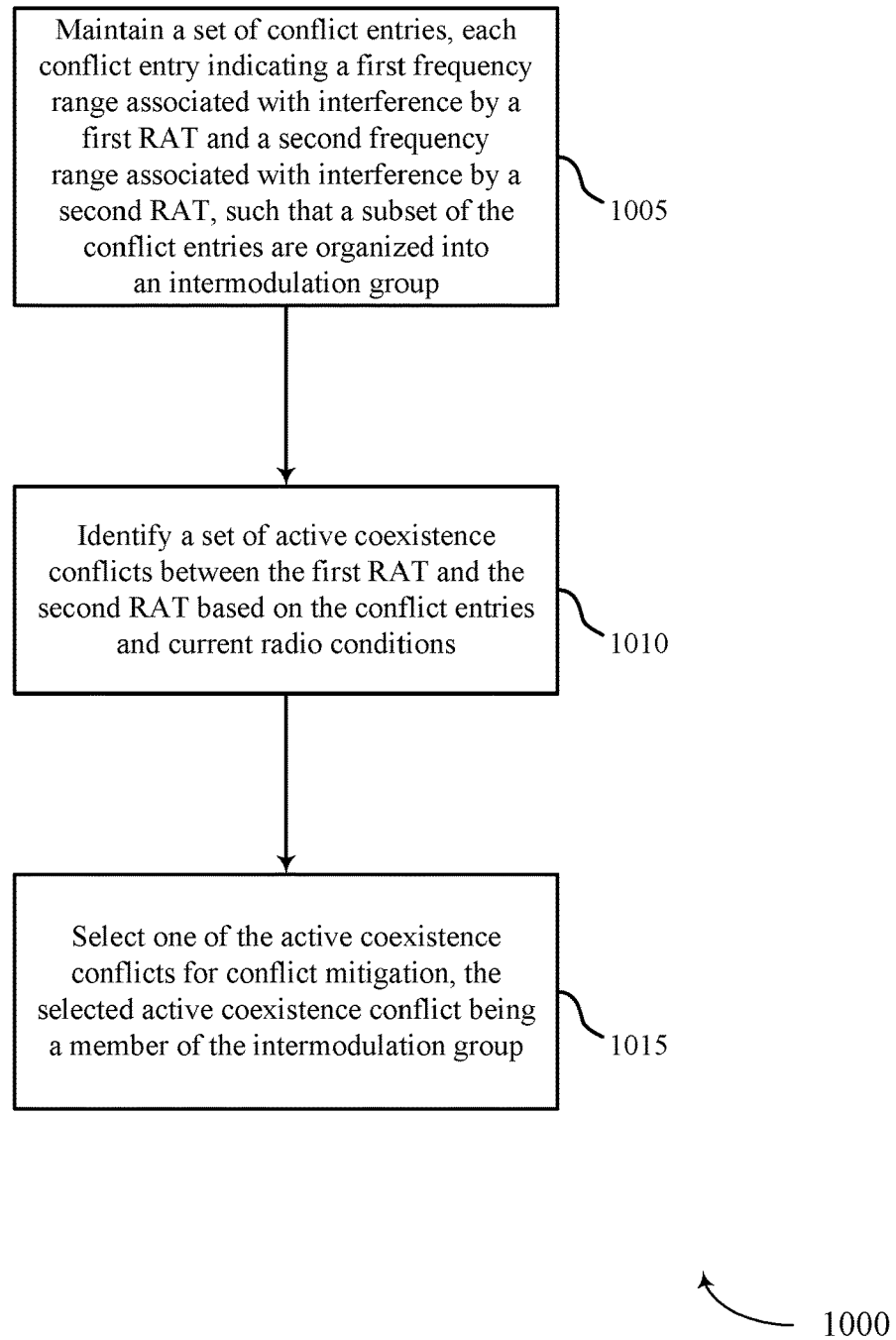
FIGS. 10-13 show flowcharts illustrating methods for identifying RAT coexistence conflicts in accordance with various aspects of the present disclosure.

FIG. 10 shows a flowchart illustrating a method 1000 for identifying RAT coexistence conflicts in accordance with various aspects of the present disclosure. The operations of method 1000 may be implemented by a STA 115, AP 105, wireless device 600, 700, 900 or its components as described with reference to FIGS. 1-9. For example, the operations of method 1000 may be performed by the coexistence conflict manager 140 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware.

At block 1005, the wireless device may maintain a plurality of conflict entries, each conflict entry indicating a first frequency range associated with interference by a first RAT and a second frequency range associated with interference by a second RAT, wherein a subset of the conflict entries are organized into at least one intermodulation group as described with reference to FIGS. 2-5. In certain examples, the operations of block 1005 may be performed by the conflict table manager 705 as described with reference to FIG. 7.

At block 1010, the wireless device may identify a plurality of active coexistence conflicts between the first RAT and the second RAT based at least in part on the conflict entries and current radio conditions as described with reference to FIGS. 2-5. In certain examples, the operations of block 1010 may be performed by the conflict identifier 710 as described with reference to FIG. 7.

At block 1015, the wireless device may select one of the active coexistence conflicts for conflict mitigation, the selected active coexistence conflict being a member of at least one intermodulation group as described with reference to FIGS. 2-5. In certain examples, the operations of block 1015 may be performed by the conflict selector 715 as described with reference to FIG. 7.

The method 1000 may also include determining that the current radio conditions indicate that the first RAT is active and that the second RAT is active and performing a mitigation policy associated with the at least one active coexistence conflict. In some examples, each conflict entry indicates that the first frequency range associated with interference by the first RAT is by one of a plurality of component carriers of the first RAT operating in a carrier aggregation mode. The method 1000 may also include identifying the one or more active coexistence conflicts is further between the component carrier of the first RAT and the second RAT.

The method 1000 may also determining an aggregate RAT conflict priority for each conflict entry associated with an active coexistence conflict based at least in part on a first RAT conflict priority and a second RAT conflict priority of that conflict entry. The selection of the at least one active coexistence conflict is based at least in part on the aggregate RAT conflict priority. The at least one conflict entry may apply to a component carrier of the second RAT, or a component carrier of the first RAT, or a combination thereof. Selection of the at least one active coexistence conflict may be based at least in part on a determination that all conflict entries in the intermodulation group are in the one or more active coexistence conflicts.

Figure 11:
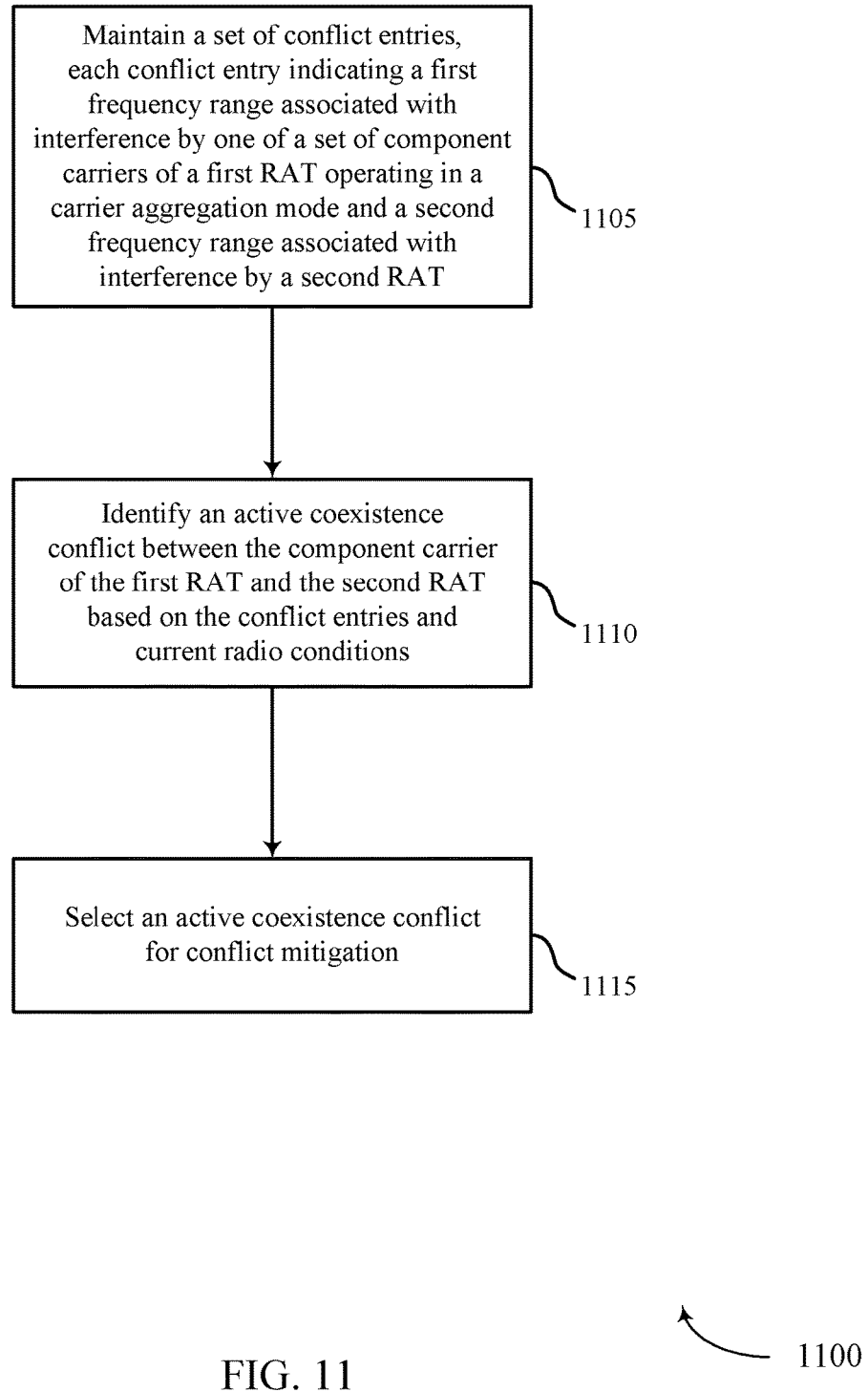

FIG. 11 shows a flowchart illustrating a method 1100 for identifying RAT coexistence conflicts in accordance with various aspects of the present disclosure. The operations of method 1100 may be implemented by a STA 115, AP 105, wireless device 600, 700, 900 or its components as described with reference to FIGS. 1-9. For example, the operations of method 1100 may be performed by the coexistence conflict manager 140 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1100 may also incorporate aspects of method 1000 of FIG. 10.

At block 1105, the wireless device may maintain a plurality of conflict entries, each conflict entry indicating a first frequency range associated with interference by one of a plurality of component carriers of a first RAT operating in a carrier aggregation mode and a second frequency range associated with interference by a second RAT as described with reference to FIGS. 2-5. In certain examples, the operations of block 1105 may be performed by the conflict table manager 705 as described with reference to FIG. 7.

At block 1110, the wireless device may identify at least one active coexistence conflict between the component carrier of the first RAT and the second RAT based at least in part on the conflict entries and current radio conditions as described with reference to FIGS. 2-5. In certain examples, the operations of block 1110 may be performed by the conflict identifier 710 as described with reference to FIG. 7. At block 1115, the wireless device may select at least one of the active coexistence conflicts for conflict mitigation as described with reference to FIGS. 2-5. In certain examples, the operations of block 1115 may be performed by the conflict selector 715 as described with reference to FIG. 7.

Figure 12:
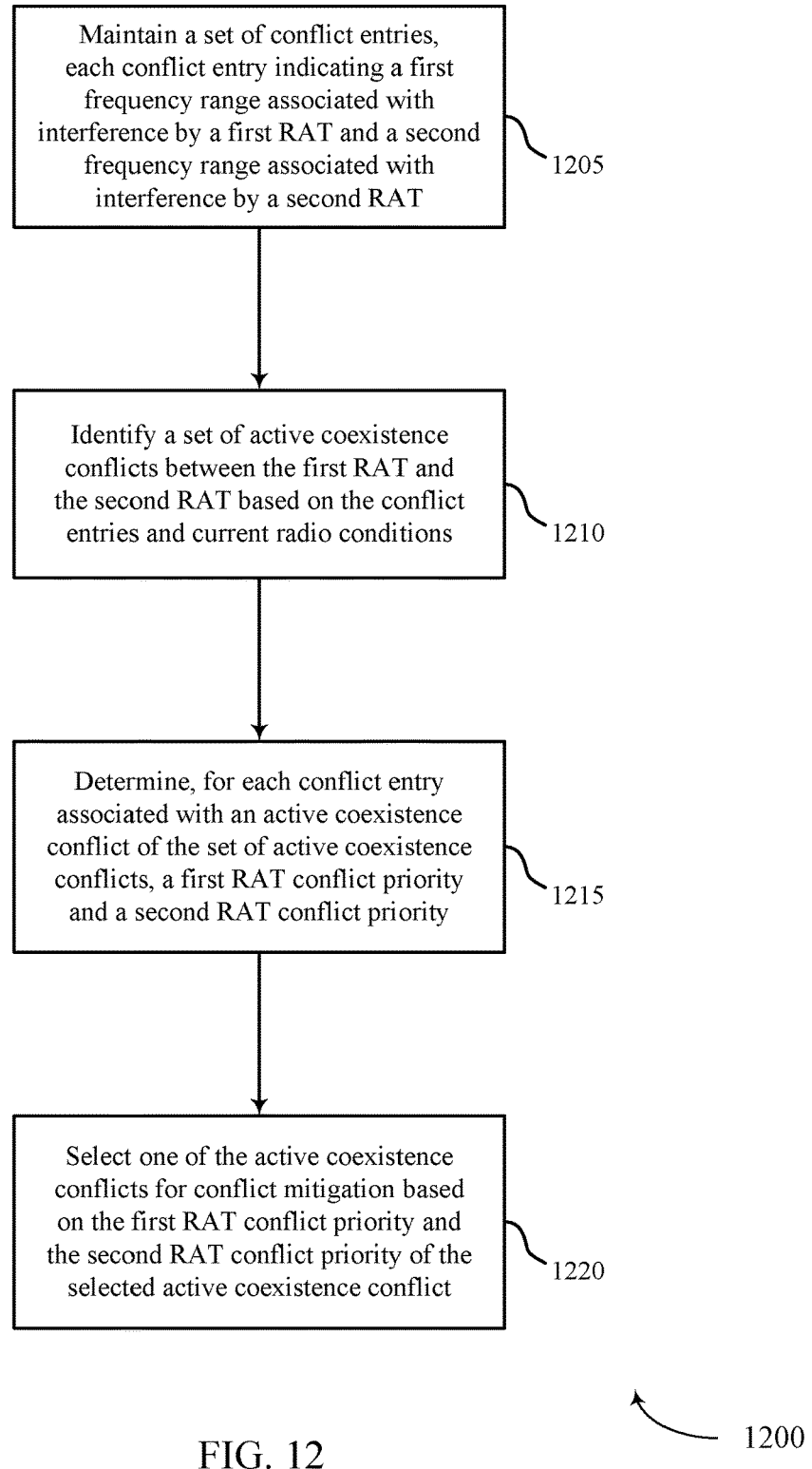

FIG. 12 shows a flowchart illustrating a method 1200 for identifying RAT coexistence conflicts in accordance with various aspects of the present disclosure. The operations of method 1200 may be implemented by a STA 115, AP 105, wireless device 600, 700, 900 or its components as described with reference to FIGS. 1-9. For example, the operations of method 1200 may be performed by the coexistence conflict manager 140 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1200 may also incorporate aspects of methods 1000 and 1100 of FIGS. 10-11.

At block 1205, the wireless device may maintain a plurality of conflict entries, each conflict entry indicating a first frequency range associated with interference by a first RAT and a second frequency range associated with interference by a second RAT as described with reference to FIGS. 2-5. In certain examples, the operations of block 1205 may be performed by the conflict table manager 705 as described with reference to FIG. 7.

At block 1210, the wireless device may identify a plurality of active coexistence conflicts between the first RAT and the second RAT based at least in part on the conflict entries and current radio conditions as described with reference to FIGS. 2-5. In certain examples, the operations of block 1210 may be performed by the conflict identifier 710 as described with reference to FIG. 7.

At block 1215, the wireless device may determine, for each conflict entry associated with an active coexistence conflict of the plurality of active coexistence conflicts, a first RAT conflict priority and a second RAT conflict priority as described with reference to FIGS. 2-5. An aggregate RAT conflict entry priority may also be determined by combining, aggregating, or concatenating the first RAT conflict priority and the second RAT conflict priority. In certain examples, the operations of block 1215 may be performed by the conflict priority manager 810 as described with reference to FIG. 8.

At block 1220, the wireless device may select one of the active coexistence conflicts for conflict mitigation based at least in part on the first RAT conflict priority and the second RAT conflict priority of the selected active coexistence conflict as described with reference to FIGS. 2-5. In cases where an aggregate RAT conflict entry priority is determined for each conflict entry, the conflict entry having the highest aggregate RAT conflict entry may be selected for conflict mitigation. In certain examples, the operations of block 1220 may be performed by the conflict selector 715 as described with reference to FIG. 7.

Figure 13:
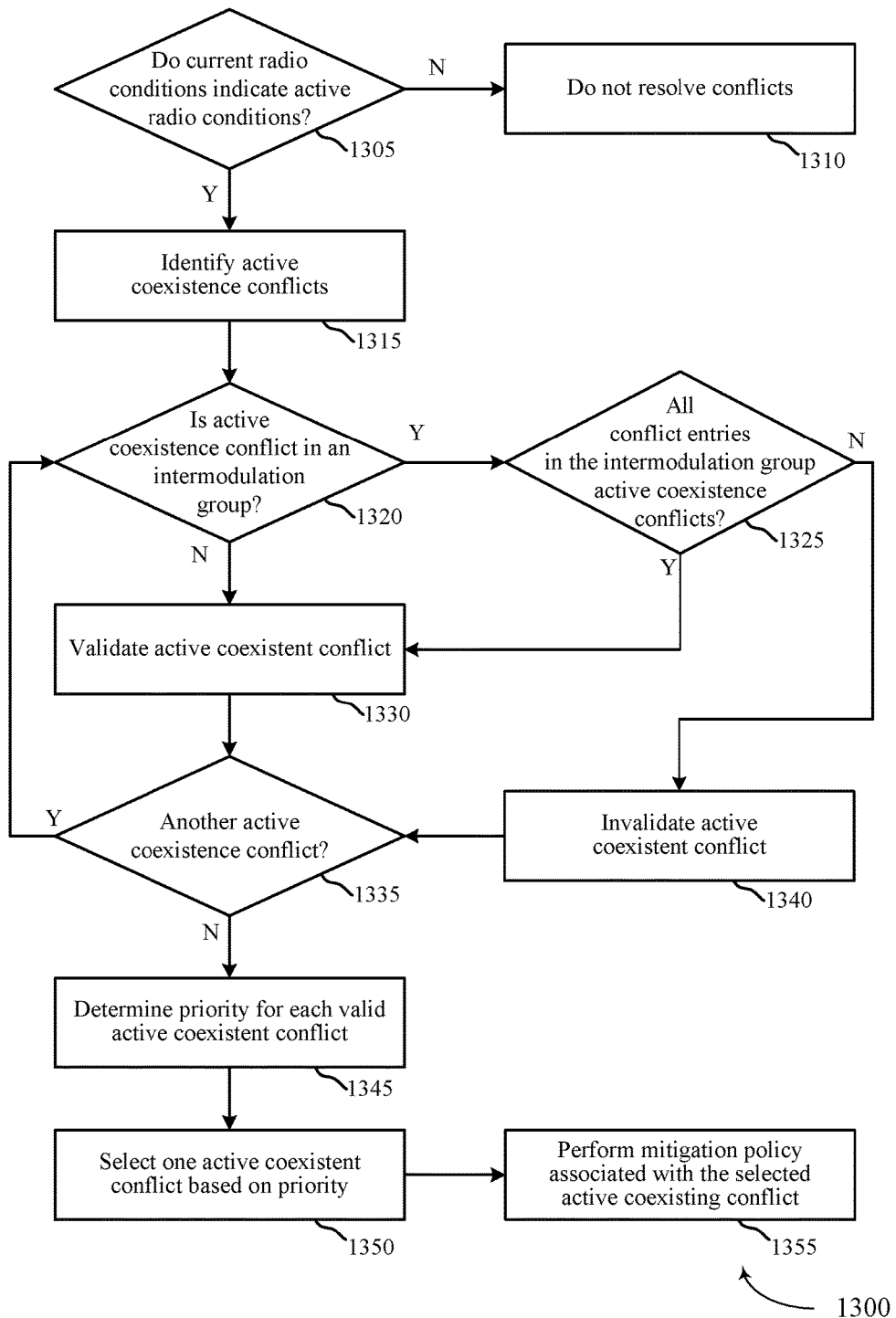

FIG. 13 shows a flowchart illustrating a method 1300 for identifying RAT coexistence conflicts in accordance with various aspects of the present disclosure. The operations of method 1300 may be implemented by a STA 115, AP 105, wireless device 600, 700, 900 or its components as described with reference to FIGS. 1-9. For example, the operations of method 1300 may be performed by the coexistence conflict manager 140 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware. The method 1300 may also incorporate aspects of methods 1000, 1100, and 1200 of FIGS. 10-12.

The method 1300 may start with block 1305 by determining if the current radio conditions indicate active radio conditions. If not, the method 1300 may proceed to block 1310 and not perform a conflict resolution as no conflicts would occur with inactive radio conditions. However, if the current radio conditions indicate active radio conditions, the method 1300 proceeds to block 1315.

At block 1315, the method 1300 identifies active coexistence conflicts. For every active coexistence conflict, the method 1300 may determine whether the active coexistence conflict is valid. First, the method 1300 proceeds to block 1320 to determine if the active coexistence conflict is in an intermodulation group. If it is not (e.g., the group of the active coexistence conflict is 0), the method 1300 validates the active coexistence conflict at block 1330. However, if the active coexistence conflict is in an intermodulation group, the method 1300 determines at block 1325 whether all conflict entries in that intermodulation group are also active coexistence conflict. If the intermodulation group contains conflict entries that are not active coexistence conflicts, the method 1300 proceeds to block 1340 to invalidate the active coexistence conflict.

At this point, one active coexistence conflict has been either validated or invalidated. Next, the method 1300 proceeds to block 1335 to check whether there are any other active coexistence conflicts. If so, the method 1300 proceeds back to block 1320 to check the next active coexistence conflict. The method 1300 continues this process until all active coexistence conflicts have been checked for intermodulation groups. Once that is complete, the method 1300 proceeds to block 1345 to determine a priority for each valid active coexistence conflict.

Based on the calculated priorities, the method 1300 selects one active coexistence conflict from all the validated active coexistence conflicts at block 1350. The method 1300 may select one active coexistence conflict for each RAT or component carrier. The method 1300 may then perform the mitigation policies associated with each selected active coexistence conflict at block 1355.

Thus, methods 1000, 1100, 1200, and 1300 may provide for identifying RAT coexistence conflicts. It should be noted that these methods describe possible implementations, and that the operations and the steps may be rearranged or otherwise modified such that other implementations are possible. In some examples, aspects from two or more of the methods 1000, 1100, 1200, 1300 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The terms "example" and "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:
1. An apparatus for wireless communication, comprising:
a memory that stores instructions; and
a processor coupled with the memory, wherein the processor and the memory are configured to:
maintain a plurality of conflict entries, each conflict entry indicating a first frequency range associated with interference by a first radio access technology (RAT) and a second frequency range associated with interference by a second RAT, wherein a subset of the plurality of conflict entries are organized into an intermodulation group;
identify one or more active coexistence conflicts between the first RAT and the second RAT based at least in part on the plurality of conflict entries and current radio conditions; and select at least one of the identified one or more active coexistence conflicts for conflict mitigation, the at least one active coexistence conflict being a member of the intermodulation group.

2. The apparatus of claim 1, wherein the processor and memory are configured to select the at least one active coexistence conflict based at least in part on a determination that all conflict entries in the intermodulation group are in the identified one or more active coexistence conflicts.

3. The apparatus of claim 1, wherein the processor and memory are configured to select the at least one active coexistence conflict for conflict mitigation based at least in part on an active coexistence conflict associated with a largest amount of coexistence interference.

4. The apparatus of claim 1, wherein the processor and memory are further configured to determine that the current radio conditions indicate that the first RAT is active and that the second RAT is active, and perform a mitigation policy associated with the at least one active coexistence conflict.

5. The apparatus of claim 1, wherein at least one of the plurality of conflict entries indicates a frequency range associated with interference by one of a plurality of component carriers of the first RAT operating in a carrier aggregation mode.

6. The apparatus of claim 5, wherein the processor and memory are configured to identify the one or more active coexistence conflicts by being configured to identify one or more active coexistence conflicts between a component carrier of the first RAT and the second RAT based at least in part on the plurality of conflict entries and the current radio conditions.

7. The apparatus of claim 6, wherein at least one of the plurality of conflict entries applies to the component carrier of the second RAT, or a secondary component carrier of the first RAT, or a combination thereof.

8. The apparatus of claim 6, wherein:
the processor and memory are configured to determine an aggregate RAT conflict priority for each conflict entry associated with an active coexistence conflict based at least in part on a first RAT conflict priority and a second RAT conflict priority of that conflict entry; and
the processor and memory are configured to select the at least one active coexistence conflict based at least in part on the aggregate RAT conflict priority.

9. The apparatus of claim 6, wherein the processor and memory are configured to select the at least one active coexistence conflict based at least in part on a determination that all conflict entries in the intermodulation group are in the one or more active coexistence conflicts.

10. The apparatus of claim 1, wherein:
the plurality of conflict entries further indicate a third frequency range associated with interference by a third RAT; and
the processor and memory are configured to identify one or more active coexistence conflicts between the third RAT and one or both of the first RAT and the second RAT.

11. The apparatus of claim 1, wherein the processor and memory are configured to:
determine a conflict priority for each active coexistence conflict, wherein the processor and memory are configured to select the at least one active coexistence conflict based at least in part on the conflict priority.

12. The apparatus of claim 11, wherein:
the conflict priority for each active coexistence conflict comprises an aggregate conflict priority based at least in part on a first conflict priority associated with the first RAT and a second conflict priority associated with the second RAT; and
the conflict priority is based at least in part on at least a type of conflict, or a frequency offset, or a direction of traffic, or a type of RAT, or a combination thereof.

13. An apparatus for wireless communication, comprising:
a memory that stores instructions; and
a processor coupled with the memory, wherein the processor and the memory are configured to:
maintain a plurality of conflict entries, each conflict entry indicating a first frequency range associated with interference by a first radio access technology (RAT) and a second frequency range associated with interference by a second RAT;
identify one or more active coexistence conflicts between the first RAT and the second RAT based at least in part on the plurality of conflict entries and current radio conditions;
determine, for each conflict entry associated with an active coexistence conflict of the one or more active coexistence conflicts, a first RAT conflict priority and a second RAT conflict priority; and
select at least one of the identified one or more active coexistence conflicts for conflict mitigation based at least in part on the first RAT conflict priority and the second RAT conflict priority of the at least one active coexistence conflict.

14. The apparatus of claim 13, wherein the processor and memory are configured to select the at least one active coexistence conflict based at least in part on a determination that the at least one active coexistence conflict has a highest conflict priority.

15. The apparatus of claim 13, wherein the processor and memory are configured to:
determine an aggregate RAT conflict priority for each conflict entry associated with an active coexistence conflict based at least in part on the first RAT conflict priority and the second RAT conflict priority of that conflict entry, wherein the aggregate RAT conflict priority is based at least in part on one or more of an addition of the first RAT conflict priority and the second RAT conflict priority, a concatenation of the first RAT conflict priority and the second RAT conflict priority, or a weighted combination of the first RAT conflict priority and the second RAT conflict priority; and
select the at least one active coexistence conflict based at least in part on the aggregate RAT conflict priority.

16. The apparatus of claim 15, wherein a conflict priority for each active coexistence conflict comprises an aggregate conflict priority based at least in part on a first conflict priority associated with the first RAT and a second conflict priority associated with the second RAT and wherein the conflict priority is based at least in part on at least a type of conflict, or a frequency offset, or a direction of traffic, or a type of RAT, or a combination thereof.

17. A method of wireless communication, comprising:
maintaining a plurality of conflict entries, each conflict entry indicating a first frequency range associated with interference by a first radio access technology (RAT) and a second frequency range associated with interference by a second RAT, wherein a subset of the plurality of conflict entries are organized into an intermodulation group;
identifying one or more active coexistence conflicts between the first RAT and the second RAT based at least in part on the plurality of conflict entries and current radio conditions; and selecting at least one of the identified one or more active coexistence conflicts for conflict mitigation, the at least one active coexistence conflict being a member of the intermodulation group.

18. The method of claim 17, wherein the selection of the at least one active coexistence conflict is based at least in part on a determination that all conflict entries in the intermodulation group are in the one or more active coexistence conflicts.

19. The method of claim 17, wherein the selection of the at least one active coexistence conflict for conflict mitigation is based at least in part on an active coexistence conflict associated with a largest amount of coexistence interference.

20. The method of claim 17, further comprising:
determining that the current radio conditions indicate that the first RAT is active and that the second RAT is active; and
performing a mitigation policy associated with the at least one active coexistence conflict.

21. The method of claim 17, wherein:
each conflict entry indicating the first frequency range associated with interference by the first RAT is by one of a plurality of component carriers of the first RAT operating in a carrier aggregation mode; and
identifying the one or more active coexistence conflicts is further between the component carrier of the first RAT and the second RAT.

22. The method of claim 21, wherein at least one conflict entry applies to a component carrier of the second RAT, or a component carrier of the first RAT, or a combination thereof.

23. The method of claim 21, further comprising:
determining an aggregate RAT conflict priority for each conflict entry associated with an active coexistence conflict based at least in part on a first RAT conflict priority and a second RAT conflict priority of that conflict entry; and
wherein the selection of the at least one active coexistence conflict is based at least in part on the aggregate RAT conflict priority.

24. The method of claim 21, wherein selecting the at least one active coexistence conflict is based at least in part on a determination that all conflict entries in the intermodulation group are in the one or more active coexistence conflicts.

25. The method of claim 17, wherein:
the plurality of conflict entries further indicate a third frequency range associated with interference by a third RAT; and
identifying the one or more active coexistence conflicts further includes identifying one or more active coexistence conflicts between the third RAT and one or both of the first RAT and the second RAT.

26. The method of claim 17, wherein at least one of the plurality of conflict entries indicates a frequency range associated with interference by one of a plurality of component carriers of the first RAT operating in a carrier aggregation mode.

27. The method of claim 17, further comprising:
determining a conflict priority for each active coexistence conflict, wherein selecting the at least one active coexistence conflict is based at least in part on the conflict priority.

28. A method of wireless communication, comprising:
maintaining a plurality of conflict entries, each conflict entry indicating a first frequency range associated with interference by a first radio access technology (RAT) and a second frequency range associated with interference by a second RAT;
identifying one or more active coexistence conflicts between the first RAT and the second RAT based at least in part on the plurality of conflict entries and current radio conditions;
determining, for each conflict entry associated with an active coexistence conflict of the one or more active coexistence conflicts, a first RAT conflict priority and a second RAT conflict priority; and
selecting at least one of the identified one or more active coexistence conflicts for conflict mitigation based at least in part on the first RAT conflict priority and the second RAT conflict priority of the at least one active coexistence conflict.

29. The method of claim 28, wherein the selection of the at least one active coexistence conflict is based at least in part on a determination that the at least one active coexistence conflict has a highest conflict priority.

30. The method of claim 28, further comprising:
determining an aggregate RAT conflict priority for each conflict entry associated with an active coexistence conflict based at least in part on the first RAT conflict priority and the second RAT conflict priority of that conflict entry,
wherein the aggregate RAT conflict priority is based at least in part on one or more of an addition of the first RAT conflict priority and the second RAT conflict priority, a concatenation of the first RAT conflict priority and the second RAT conflict priority, or a weighted combination of the first RAT conflict priority and the second RAT conflict priority, and
wherein the selection of the at least one active coexistence conflict is based at least in part on the aggregate RAT conflict priority.

\* \* \* \* \*